United States Patent [19]

Bracegirdle

[11] E Patent Number: Re. 32,206

[45] Reissued Date of Patent: Jul. 15, 1986

[54] PROCESS FOR MAKING ASPHALT CONCRETE

[76] Inventor: Paul E. Bracegirdle, 559 Fairman La., Langhorne, Pa. 19047

[21] Appl. No.: 716,719

[22] Filed: Mar. 27, 1985

Related U.S. Patent Documents

Reissue of:

[64] Patent No.: 4,378,162
Issued: Mar. 29, 1983
Appl. No.: 206,237
Filed: Nov. 12, 1980

U.S. Applications:

[62] Division of Ser. No. 13,931, Feb. 22, 1979, Pat. No. 4,245,915.

[51] Int. Cl.[4] ..... E01C 19/10

[52] U.S. Cl. ..... 366/7; 366/8

[58] Field of Search ..... 366/3, 4, 7, 8, 10, 366/12, 13, 16, 17, 22, 23, 24, 25, 29, 34, 40, 132, 149, 151, 152, 184

[56] References Cited

U.S. PATENT DOCUMENTS

| | | |
|---|---|---|
| Re. 29,496 | 12/1977 | Dydzyk . |
| 484,735 | 10/1892 | Hall et al. . |
| 725,693 | 4/1903 | Ford . |
| 1,188,081 | 6/1916 | Kirschbraun . |
| 1,370,764 | 3/1921 | Popkess . |
| 1,443,529 | 1/1923 | Dworzak . |
| 1,717,465 | 6/1929 | O'Meara . |
| 1,789,021 | 1/1931 | Parker . |
| 1,868,512 | 7/1932 | Ahlmann . |
| 1,966,647 | 7/1934 | Ross . |
| 1,984,315 | 12/1934 | Morris . |
| 2,015,056 | 9/1935 | Barnes . |
| 2,125,860 | 8/1938 | Sommer . |
| 2,256,281 | 9/1941 | Finley . |
| 2,305,603 | 12/1942 | Cadman . |
| 2,477,412 | 7/1949 | Lohse . |
| 2,487,887 | 11/1949 | McEachran . |
| 2,491,194 | 12/1949 | McShea . |
| 2,519,148 | 8/1950 | McShea . |
| 2,540,706 | 2/1951 | Beck et al. . |

(List continued on next page.)

FOREIGN PATENT DOCUMENTS

| | | |
|---|---|---|
| 10119 | of 1976 | Australia . |
| 257676 | 10/1967 | Austria . |
| 925277 | 3/1955 | Fed. Rep. of Germany . |
| 1191786 | 4/1965 | Fed. Rep. of Germany . |
| 2062358 | 6/1972 | Fed. Rep. of Germany . |
| 2217704 | 10/1972 | Fed. Rep. of Germany . |
| 2351094 | 4/1974 | Fed. Rep. of Germany . |
| 2606422 | 8/1976 | Fed. Rep. of Germany . |
| 2712102 | 9/1978 | Fed. Rep. of Germany . |
| 2827608 | 1/1980 | Fed. Rep. of Germany . |
| 2848145 | 4/1980 | Fed. Rep. of Germany . |
| 567628 | 5/1973 | Switzerland . |
| 1219368 | 1/1971 | United Kingdom . |
| 1340762 | 12/1973 | United Kingdom . |
| 1400721 | 7/1975 | United Kingdom . |
| 1443424 | 7/1976 | United Kingdom . |
| 1476097 | 6/1977 | United Kingdom . |
| 2036574 | 7/1980 | United Kingdom . |

OTHER PUBLICATIONS

Gadallah, Ahmed Atef et al., "A Suggested Method for the Preparation and Testing of Asphalt Emulsion Treated Mixtures Using Marshall Equipment," *Proceedings–Association of Asphalt Paving Technologists Technical Sessions,* San Antonio, Texas, Feb., 1977, pp. 196–227.

Schenkel, G., *Plastics Extrusion Technology,* Iliffe Books Ltd., London, England, 1966, pp. 42–46.

*Primary Examiner*—Philip R. Coe

*Attorney, Agent, or Firm*—Panitch, Schwarze, Jacobs & Nadel

[57] ABSTRACT

A process for making asphalt concrete comprises mixing starting materials including aggregate and binder material and optionally, other additives, to a final temperature of about 60° C. to about 150° C. in an indirectly heated mixing chamber which is sealed. The moisture content of the asphalt concrete mixture is controlled as a function of the moisture content of the starting materials. Apparatus for performing the process in a continuous or batch operation is also set forth.

20 Claims, 22 Drawing Figures

U.S. PATENT DOCUMENTS 2,609,305 9/1952 Roediger .
2,611,590 9/1952 Jebens .
2,710,744 6/1955 Hensler .
2,715,517 8/1955 Bojner .
2,721,806 10/1955 Oberg et al. .
2,731,241 1/1956 Christian .
2,758,823 8/1956 Vasby .
2,900,109 8/1959 Hoopes et al. .
2,958,107 11/1960 Hartley .
3,020,025 2/1962 O'Mara .
3,056,588 10/1962 Alexandrovsky .
3,106,384 10/1963 Preeman .
3,207,588 9/1965 Slayter et al. .
3,250,321 5/1966 Root .
3,263,748 8/1966 Jemal et al. .
3,285,330 11/1966 Root .
3,300,193 1/1967 Badgett .
3,456,906 7/1969 Troy .
3,480,260 11/1969 Fejmert .
3,484,083 12/1969 Albertini .
3,486,940 12/1969 Christian .
3,500,901 3/1970 Root et al. .
3,583,172 6/1971 Koudelka et al. .
3,592,453 7/1971 Jager .
3,601,373 8/1971 Hartley .
3,627,014 12/1971 Akashi et al. .
3,752,653 8/1973 Weber .
3,762,947 10/1973 Ornstein et al. .
3,765,481 10/1973 Root .
3,778,035 12/1973 MacKinney .
3,793,745 2/1974 Myers .
3,812,821 5/1974 Laycock .
3,832,201 8/1974 Shearer .
3,840,215 10/1974 McConnaughay .
3,845,941 11/1974 Mendenhall .
3,880,410 4/1975 Heise .
3,940,120 2/1976 Miller .
3,971,666 7/1976 Mendenhall .
3,975,002 8/1976 Mendenhall .
3,999,743 12/1976 Mendenhall .
4,000,000 12/1976 Mendenhall .
4,007,016 2/1977 Weber .
4,025,057 5/1977 Shearer .
4,034,968 7/1977 Mendenhall .
4,040,768 8/1977 Christian .
4,066,247 1/1978 Mendenhall .
4,067,552 1/1978 Mendenhall .
4,074,894 2/1978 Mendenhall .
4,126,519 11/1978 Murray .
4,136,964 1/1979 Swisher .
4,144,359 3/1979 Zahedi et al. .

PROCESS FOR MAKING ASPHALT CONCRETE

Matter enclosed in heavy brackets [ ] appears in the original patent but forms no part of this reissue specification; matter printed in italics indicates the additions made by reissue.

CROSS REFERENCE TO RELATED APPLICATION

This application is a divisional application of my copending application Ser. No. 013,931, filed Feb. 22, 1979, and now U.S. Pat. No. 4,245,915.

BACKGROUND OF THE INVENTION

The present invention relates to a process for making asphalt concrete from aggregate, such as stone and sand, and binder material, such as asphalt cement. Other additives may be included.

Current and prior processes and apparatus for making asphalt concrete include direct-fired processes and apparatus and indirect-fired processes and apparatus. Direct-fired processes generally are of two types. In one, aggregate is directly heated, as by a flame, and the heated aggregate is mixed with a binder to form the asphalt concrete. This is a batch process. In a second process, a continuous process, a mixture of aggregate and binder is directly heated, usually by an open flame burner. In indirect-fired processes, the mixture within a mixing apparatus is indirectly heated by means of a heat transfer fluid.

The following U.S. patents disclose processes and/or apparatus using the direct-fired technique: U.S. Pat. No. RE. 29,496 of Dydzyk, U.S. Pat. Nos. 1,984,315 of Morris, 2,256,281 of Finley, 2,487,887 of McEachran, and 3,840,215 of McConnaughay. With prior art systems and particularly direct-fired systems, significant amounts of hydrocarbons, such as polycyclic organic materials which include suspected carcinogens, particulate matter and the like are exhausted from the apparatus and vented into the atmosphere.

There have been some attempts to reduce the particulate pollutants, for example, the system set forth in U.S. Pat. No. RE. 29,496. This patent discloses that the exhaust gases from the direct-fired mixer are recycled through the mixer after first passing through a heat exchanger and dust separator. U.S. Pat. No. 3,840,215 discloses passing exhaust gases containing dust particles and other particulate solids into knock out boxes where the dust and solid particles are removed before the gases are exhausted. However, the production and emission of non-particulate pollutants are not controlled by these devices and processes.

Moreover, no attempt is generally made to maintain moisture in asphalt concrete and to control the amount of moisture in asphalt concrete within the predetermined limits as set forth hereinafter. The high heat associated with the direct-fired mixers drives substantially all of the free and combined water from the product, in contrast to the present invention wherein some moisture remains in the asphalt concrete product.

Some moisture can be retained within the product made in prior art direct and indirect-fired mixing apparatus by reducing the final mixture temperature. Any retained moisture is purely a function of temperature, since pressure cannot be controlled in prior art processes and apparatus. The present invention overcomes problems relating to control of moisture content at any and all temperatures by controlling both temperature and pressure.

Two general types of indirect-fired apparatus used for heating and mixing asphalt concrete are known. In one type, the entire mixing chamber is rotated, similar to the direct-fired apparatus, but the heat is provided by indirect heat-exchange fluid contained in tubes or pipes distributed throughout the rotating mixing drum. Typical processes and apparatus wherein heat exchange occurs in tubes within the rotating drum of the mixing chamber include those diclosed in the following U.S. Pat. Nos. 2,715,517 of Bojner and 3,845,941, 4,000,000, 4,067,552 and 4,074,894, all of Mendenhall. Mendenhall's patent 4,074,894 discloses an indirect-fired mixer wherein water vapor and hydrocarbon gases evaporated from the heated mixture are withdrawn from the mixing chamber in a stream of air. The water vapor withdrawn with the hydrocarbons and air is condensed and removed from the mixture. The remaining gases from the heated mixture are recycled, along with air, to the combustion chamber for combustion and eventual discharge to the atmosphere. Thus, while some attempt is made in this patent to reduce pollutants, it is believed that a significant quantity remain due to the exhaustion of the combustion of gases formed by the mixture into the atmosphere. There has been no attempt to control the moisture content of the product when using these indirect-fired mixers. It should be noted that effective control of moisture in the product is not possible at atmospheric pressure.

Another type of indirect-fired apparatus that could be used for making asphalt concrete comprises a mixing chamber wherein the mixture is mixed and heated by screw conveyors having hollow flights and at least one hollow shaft containing a heat exchange material. Several different embodiments of this type of apparatus are described in the following U.S. Pat. Nos. 1,717,465 of O'Meara, 2,721,806 of Oberg et al., 2,731,241 of Christian, 3,020,025 of O'Mara, 3,056,588 of Alexandrovsky, 3,250,321 of Root 3rd, 3,263,748 of Jemal et al., 3,285,330 of Root 3rd, 3,486,740 of Christian, 3,500,901 of Root 3rd et al., 3,765,481 of Root, and 4,040,786 of Christian. The only patent of this group which discloses a process or apparatus for making asphalt concrete is 2,731,241.

The patents relating to the indirect-fired apparatus using hollow flights, hollow shaft screw conveyors to mix and heat the mixture generally suffer from the same inherent disadvantages of the other type of indirect-fired apparatus. These disadvantages include venting of gases produced by heating the mixture to the atmosphere and failure to adequately control the moisture content of the mixture.

The prior art systems, both the direct and indirect-fired systems, generally operate at high temperatures to produce an asphalt concrete product having a discharge temperature of about 121°-154° C. (250°-310° F.) and require large amounts of energy. None of the prior art systems has recognized the energy value of moisture contained in the aggregate and/or binder used to make asphalt concrete. Instead of using the energy in the entrained moisture, the prior art systems use more energy to drive off the moisture, typically about 20-50% of the energy used. There is no recognition that any particular amount of moisture in the final product results in a superior product, contrary to the present invention.

The present invention is based upon the discovery that the strength and specific gravity or density of hot mixed asphalt concrete can be increased by controlling the moisture content of the asphalt concrete during mixing within prescribed limits defined by the environmental conditions and the moisture content and absorption of the starting materials. Strength and density both affect the useful life and durability of asphalt concrete when used for its normal purposes, for example in highways, driveways, parking lots and the like.

SUMMARY OF THE INVENTION

The present invention overcomes the disadvantages of prior art processes and apparatus for making asphalt concrete.

The process according to the present invention for making asphalt concrete comprises:

(a) detecting the moisture content of aggregate selected from the group consisting of raw virgin aggregate, recycled aggregate, and mixtures thereof, (b) introducing starting materials selected from the group consisting of the aggregate and a binder material into a mixing chamber, (c) selectively sealing the mixing chamber so that the interior of the chamber does not communicate with the atmosphere when sealed, (d) indirectly heating and mixing the aggregate and the binder material in the chamber when the chamber is sealed to produce an asphalt concrete mixture having a final temperature range of about 60° C. to about 150° C.

(e) adjusting the moisture content of the asphalt concrete mixture to a predetermined amount based on the moisture content of the starting materials, and (f) removing the asphalt concrete mixture from the chamber while it is in the stated temperature range.

By forming asphalt concrete in accordance with the process of the present invention, asphalt concrete of increased strength and density can be obtained at lower temperatures than heretofore possible. The use of lower temperatures results in the use of less energy and, accordingly, the same amount of asphalt concrete with increased strength and density can be obtained at a lower cost than at present. The cost factor is significant, since energy costs almost surely will continue to rise in the future.

The use of the energy value of the moisture contained in the components of the product, and additional water if necessary, and the use of the energy value [if] *of* the removed vapor, are important aspects of the present invention. Rather than using more energy to expel all of the moisture, the moisture and the heat retained therein [is] *are* used in the present invention.

Another significant advantage of the present invention is that substantially zero pollutants are released to the atmosphere. As used herein, the term "substantially zero" means that the amount of pollutants released into the atmosphere in accordance with the present invention is sufficiently low so that there is not a health problem. In other words, the amount of pollutants released into the atmosphere according to the present invention is below the limits according to federal, state and local standards for asphalt concrete producing equipment and processes. It should be noted, however, that this condition exists when venting the vapor to atmosphere. When using the condenser, there are no atmospheric emissions at all.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENTS

Figure 1A:
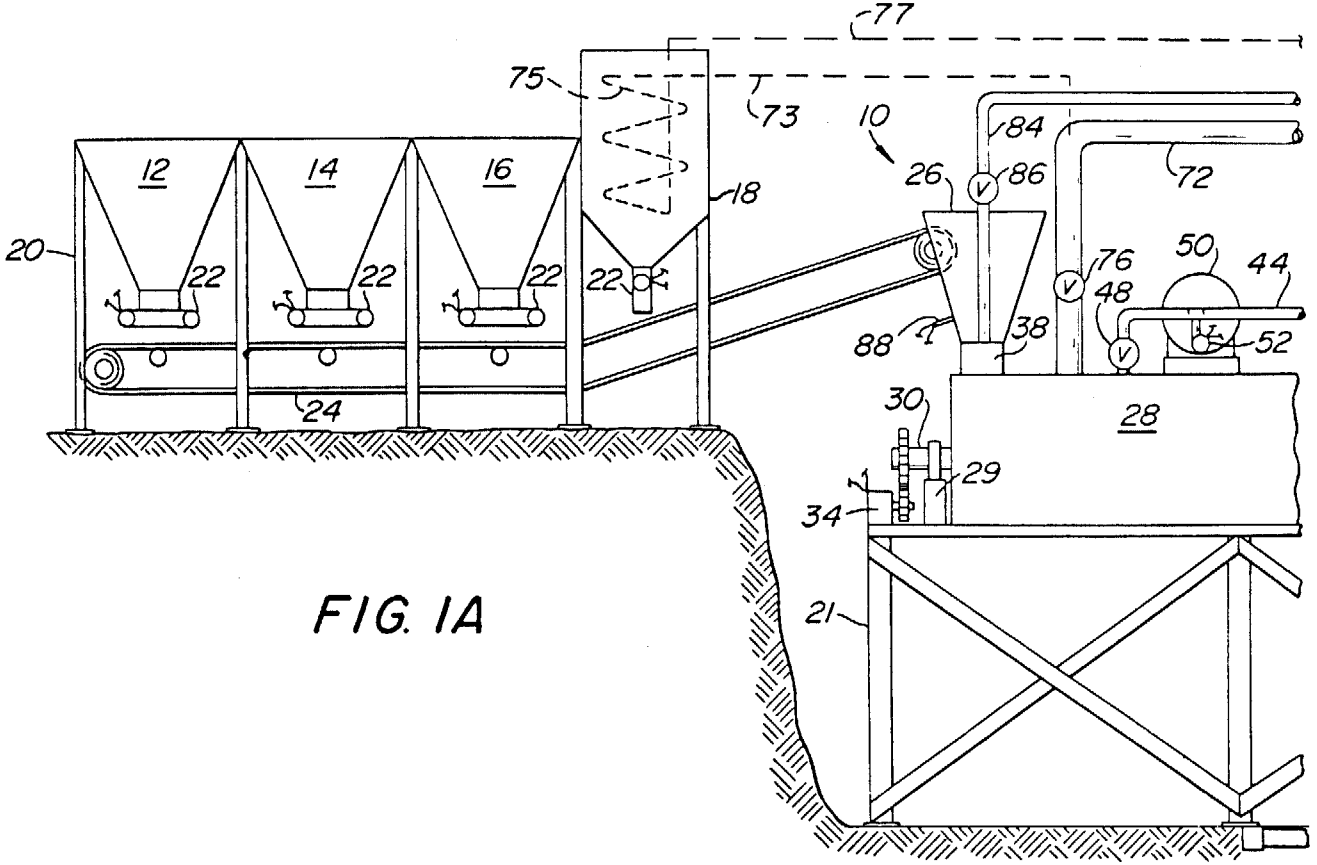
FIG. 1A is a side elevation view of the lefthand portion of a preferred embodiment of apparatus for making asphalt concrete according to the present invention.

Referring to the drawings in detail, wherein like numerals indicate like elements, there is shown apparatus for practicing the present invention designated generally as 10.

Apparatus 10 may be installed outdoors, indoors, or on vehicle beds to provide for portability of the apparatus to various job sites. For purposes of illustration, apparatus 10 includes a plurality of sources of aggregate such as silo 12 for coarse aggregate, e.g., about ¾ inch to about ⅜ inch, silo 14 for medium aggregate, e.g., about ⅜ inch to about 4 mesh, silo 16 for fine aggregate, e.g., about 4 mesh to about 200 mesh, and silo 18 for very fine aggregate, e.g., about 200 mesh to about 600 mesh. The mesh numbers of the sieves refer to U.S. Standard Sieves.

The aggregate can be any inert material, such as gravel, sand, shell, broken stone, blast furnace slag (the non-metallic product, consisting essentially of silicates and alumino-silicates of lime and other bases, that is developed simultaneously with iron in a blast furnace), or combinations thereof. The sizes and types of the aggregates are merely for purposes of illustration, since specifications for a particular job usually dictate the particular size and type of aggregate. In addition, the aggregate may be raw virgin aggregate or recycled aggregate obtained by crushing old pavement such as highways, parking lots and the like. Recycled asphalt concrete aggregate will retain some hardened binder material which will be totally reclaimed. It may require addition of new binder material and/or other additives know to those skilled in the art. The aggregate should form about 94 to about 98% by weight of the final asphalt concrete product.

The silos are illustrated as being supported on a frame 20. Each silo is provided with a gravimetric or volumetric feeder 22 at its discharge point for selectively controlling the amount and rate of discharge of aggregate from the various silos. Each feeder 22 deposits the aggregate on an endless conveyor belt 24 driven by any conventional motor and drive mechanism. Conveyor belt 24 communicates with an inlet hopper 26.

In addition to the frame 20, the apparatus 10 includes a frame 21. For purposes of illustration, frame 20 is at a higher elevation than frame 21 since this minimizes the discrepancy in elevation between the feeders and the inlet hopper 26. A single frame or frames at the same elevation could be utilized. Frames 20 and 21 may be fixed or portable, as when they are mounted on truck or trailer beds.

A mixing chamber 28 is supported by frame 21 and includes a heat exchanger-mixer for indirectly heating the asphalt concrete mixture. Mixer 28 may include a hollow flight, hollow shaft screw conveyormixer as disclosed in the patents set forth hereinbefore within an insulated chamber or within a chamber having a double wall containing heat exchange material between the double walls. The presently preferred heat exchanger-mixer is a twin shaft type wherein the shafts and their associated mixing blades or flights are internally heated so that the asphalt concrete is indirectly heated. Suitable screw conveyors include, for example, those disclosed in U.S. Pat. No. 3,020,025 of O'Mara, having mixing blades arranged in a discontinuous screw pattern, or those manufactured by The Bethlehem Corporation under the trademark PORCUPINE. Indirectly heating asphalt concrete mixtures and removing moisture under its own pressure minimizes the production of toxic gases and other undesirable by-products. In addition, oxidation of the ingredients which would occur in the presence of oxygen needed to support combustion in a direct-fired heat exchanger is eliminated. Moreover, oxidation of the ingredients which would occur by the presence of oxygen in the air used as a medium to remove moisture from the mixture in the prior art processes and apparatus is also eliminated.

Mixer 28 includes a pair of hollow shafts 30 and 32 leading to hollow flights and/or mixing blades. Shaft 30 is supported by bearings 29 and 31 and is driven by motor 34 coupled to the shaft by suitable gearing. Shaft 32 is supported by bearings 33 and 35 and is driven by motor 36 coupled to the shaft by suitable gearing. Motors 34 and 36 are secured to frame 21. Other drive arrangements are possible and may be substituted for the drive arrangement disclosed herein.

Shafts 30 and 32 should be adapted to be driven in either a clockwise or counterclockwise direction. When the apparatus is operating in a continuous or semi-continuous mode, shaft 30 should be driven clockwise and shaft 32 driven counterclockwise to cause the mixture to be propelled from the inlet end to the outlet end of mixing chamber 28. When the apparatus is operated in a batch mode, shafts 30 and 32 both should be operated in a clockwise direction so that the mixture is caused to move in a generally elongated elliptical or reciprocal pattern between the inlet and outlet ends of mixing chamber 28.

It is important that mixing chamber 28 be sealed during mixing of the asphalt concrete mixture to properly control the moisture content of the asphalt concrete product, to eliminate oxidation and to eliminate the emission of pollutants. In order to have a sealable inlet, there is provided an inlet control 38 for introducing the aggregate into mixer 28. Preferably, inlet control 38 is a screw conveyor which carries sufficient aggregate and is so dimensioned that it effectively seals the interior of chamber 28 from the atmosphere. Instead of a screw conveyor, inlet control 38 may comprise any type of valve capable of metering aggregate material and selectively sealing mixing chamber 28 from communication with the atmosphere.

Mixer 28 has an outlet control 40 which operates in the same manner as inlet control 38. Thus, outlet control 40 must be able to allow the asphalt concrete product to be discharged from mixing chamber 28, and must be capable of selectively sealing the mixing chamber during mixing of the mixture.

Inlet control 38 and outlet control 40 may be of the same or different construction. As presently preferred, inlet control 38 and outlet control 40 are both variable speed screw conveyors within enclosed chambers. The enclosed chamber for inlet control 38 communicates at one end with the bottom of hopper 26 and at its other end with the lefthand or inlet end of mixer 28. Likewise, the enclosure for outlet control 40 communicates at one end with the bottom portion of the righthand or outlet end of mixer 28 and at its other end with a receptacle, vehicle 41 or other means for transporting the asphalt concrete. Control means 38 and 40 each should have a suitable sealing device, such as a valve, to selectively seal chamber 28 when no material is present in the screw conveyors. Any other control means may be used for inlet control 38 and outlet control 40, such as star valves, solenoid-operated valves, or the like. As stated above, the only requirements for the inlet and outlet controls are that they allow for the metering of material into and out of mixing chamber 28 and allow mixing chamber 28 to be sealed during mixing.

Binder material which is mixed with the aggregate to form asphalt concrete is contained in tank 42, shown for purposes of illustration as being located on frame 21 at an elevation above the elevation of mixer 28. Binder material is pumped from tank 42 by means of pump 46 through conduit 44 and valve 48 into the mixer 28. Actuation of pump 46 may be controlled by a timer. The binder material may be added to the mixing chamber anywhere along the length of the chamber, but preferably, it is added near the inlet end as shown in FIG. 1A.

The binder material may be any of the usual types of binder material used in making asphalt concrete. Suitable types include, for example, asphalt cement, asphalt cement-water emulsions having a typical amount of about 50–70 weight percent asphalt cement, sulfur-based binder, asphalt cement-sulfur mixtures, and the like. Typically the type of binder material is determined by the job specifications for a particular project. The type of binder material is not as important as knowing the water content, if any, of the binder material. Generally, the binder material comprises about 2 to about 6% by weight of the asphalt concrete product.

Additives to prevent or minimize fouling of the apparatus, to wet the surface of virgin aggregate for more complete coverage by the binder material and/or to rejuvenate the recycled aggregate material may be added to mixing chamber 28. Preferably, such additives are added to the binder material in conduit 44 from storage tank 50 by means of pump 52. Actuation of pump 52 may be controlled by a timer. When additives are added to the binder material, it is possible to eliminate another conduit connection to mixing chamber 28 which would have to be sealed. Of course, an additional sealable connection may be used if desired and located substantially anywhere along the length of mixing chamber 28, but preferably near the inlet end. Anti-fouling agents may also be added to the condenser system to be described hereinafter.

Typically, the additive should be metered into the binder material so that about 0.1 to about 2.0% of the additive based on the weight of the binder material is added to the mixer. The final concentration for the additive should be about 0.002 to about 0.12% by weight based on the total product.

An additive having these characteristics is a nonionic surfactant of the alkylaryl polyether alcohol type. This type of surfactant is sold by the Rohm and Haas Company under the trademark "TRITON". Preferred surfactants include Rohm and Haas' TRITON X-100, TRITON X-102 and TRITON X-207 surfactants. TRITON X-100 is as an octylphenoxypolyethoxyethanol. TRITON X-102 is octylphenoxypolyethoxyethanol containing 12–13 moles of ethylene oxide. TRITON X-207, the presently preferred surfactant, is described as an oil-soluble nonionic alkylaryl polyether alcohol type of surfactant.

The heat exchanger-mixer is heated by means of a heat transfer fluid contained within the hollow shafts, flights and blades. The fluid may be a gas, such as steam, or a liquid, such as hot oil or commercially available molten salt mixtures, such as a mixture of 53% $KNO_3$, 40% $NaNO_2$ and 7% $NaNO_3$, or the like. No novelty is claimed concerning the type of heat exchange fluid. The heat exchange fluid is supplied to the mixing blades, paddles or flights through shafts 30 and 32. Shafts 30 and 32 are connected by well known sealable rotary joints 60 and 62 which are connected to an inlet conduit 58 and a return conduit 64. Conduits 58 and 64 may contain various valves as appropriate. Conduits 58 and 64 are connected at their other ends to a source 54 of the heat transfer fluid. The fluid is pumped by pump 56 through conduit 58, rotary joints 60 and 62 and shafts 30 and 32 to the heat exchanger mixer. The fluid is then returned through conduit 64 to source 54 where it is reheated in any manner. The fluid may be heated, for example, by an oil burning heater, a gas burning heater, an electrical heater or solar heater. Suitable heating units are available from American Hydrotherm Corp., for example.

The temperature of the product at the outlet end of mixing chamber 28 is generally maintained between about 60° C. (140° F.) and about 150° C. (302° F.), preferably between about 93.3° C. (200° F.) and about 150° C. (302° F.) and most preferably between about 100° C. (212° F.) and about 121° C. (250° F.).

The heat exchanger-mixer apparatus may be used in a continuous manner, in a semi-continuous manner or in a batch manner. In a semi-continuous operation, there is not a continuous discharge of product. Rather, the product can be retained in the mixing chamber and intermittently discharged into a number of containers, for example, vehicles. In a batch operation, the entire contents of a single batch of mixture is completely discharged.

Figure 1B:
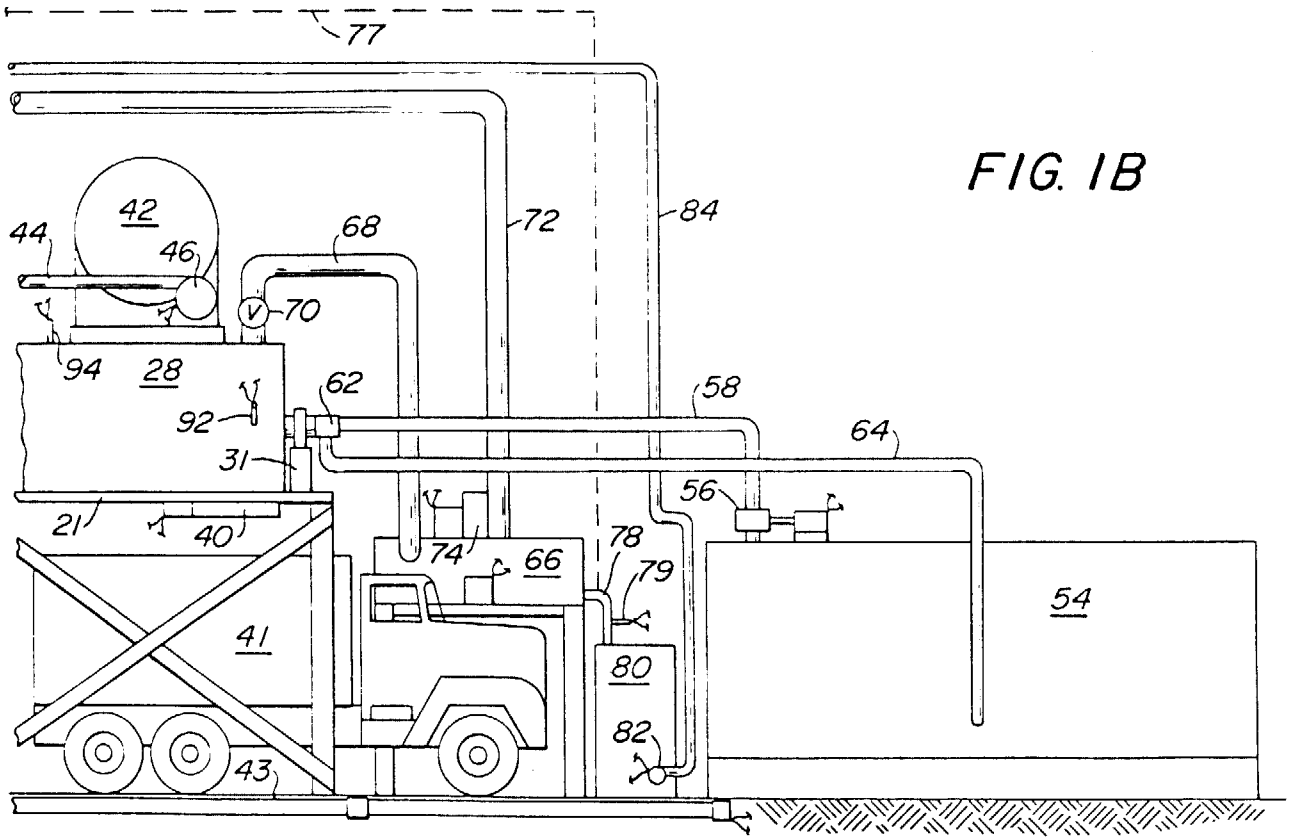
FIG. 1B is a side elevation view of the righthand portion of the apparatus of FIG. 1A.
Figure 2A:
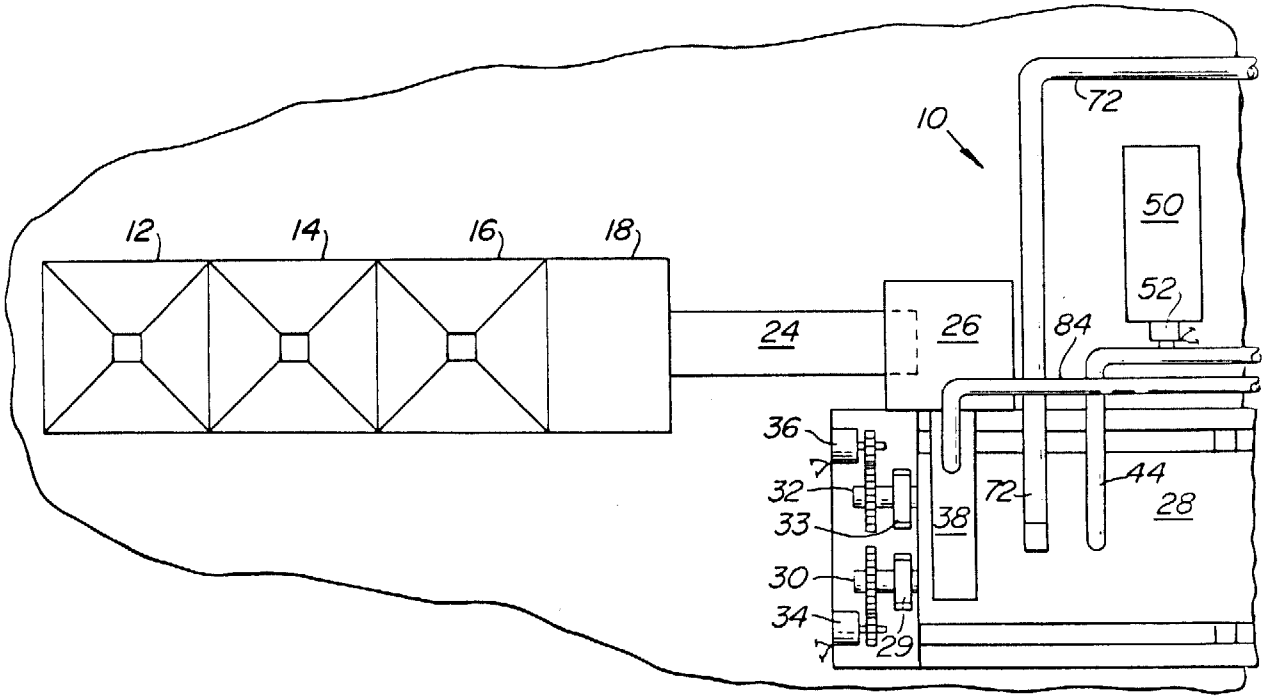
FIG. 2A is a top plan view of the lefthand portion of the apparatus corresponding to FIG. 1A.
Figure 2B:
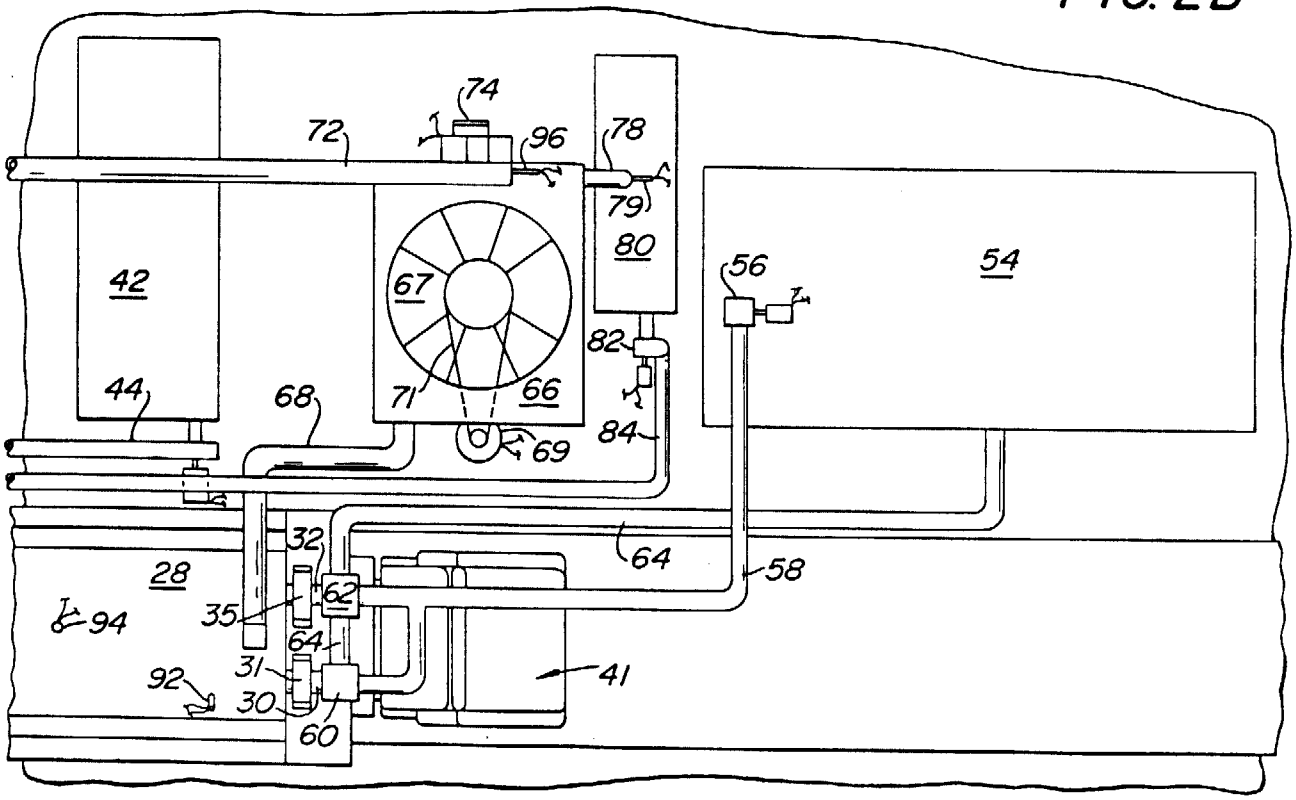
FIG. 2B is a top plan view of the righthand portion of the apparatus corresponding to FIG. 1B.

When operating in a continuous manner, the asphalt concrete product is discharged from outlet control 40 onto a conveyor, not shown, which in turn may discharge the asphalt concrete into a storage silo, not shown, or into vehicle 41. As illustrated most clearly in FIG. 1B, particularly with reference to a batch operation or a semi-continuous operation, frame 21 is sufficiently high to allow vehicle 41 to park beneath outlet control 40 to be filled with the asphalt concrete product. It should be understood that this arrangement is merely for purposes of illustration and that a variety of alternative arrangements are possible. If desired, vehicle 41 may be parked on a weighing scale 43 to facilitate accurate control of the amount of asphalt concrete to be carried by the vehicle.

In test runs of laboratory apparatus made in accordance with the present invention, only trace amounts of particulate and hydrocarbon pollutants were generated, the amounts being well within the current pollution control standards. Thus, if desired, any excess moisture in the form of water vapor and/or other gases could be vented to the atmosphere through an appropriate bleed valve in the top portion of the mixing chamber. However, to reduce atmospheric emissions to zero, a water vapor condensing system to be described hereinafter is preferred.

Water vapor and other gases evaporated from the asphalt concrete mixture within mixing chamber 28 are preferably removed therefrom and condensed in any convenient manner. For purposes of illustration, two alternative types of condensing systems are shown. In one, water evaporated from mixing chamber 28 is condensed in a condenser 66, shown as being air cooled by fan 67 driven by motor 69 and drive belt 71. A suitable condenser is available from Happy Division of Therma Technology, Inc. Other cooling means may be used to cool the condenser, including enclosed heat exchange fluids, and the like.

Mixing chamber 28 is connected to [condense] *condenser* 66 by conduits 68 and 72. Valve 70 selectively seals chamber 28 from conduit 68. Valve 76 selectively seals chamber 28 from conduit 72. A pump 74 is adapted to pump water vapor and other gases through conduit 72 and is only required at final product temperatures less than 100° C. in mixing chamber 28. Optional pressure sensor 96 detects pressure in conduit 72 to check pressure drop in the conduit or to determine the amount of vacuum created by condenser 66 when the system is operating in a vacuum mode. It is preferred to allow the water vapor and other gases to be expelled from the mixing chamber by means of their own vapor pressure.

Another and presently the preferred embodiment for condensing water vapor and other gases evaporated from the product in chamber is to use feed silos 12, 14, 16 and/or 18 as heat sinks into which a condensing coil may be located. This has the advantage of using the feedstock aggregate to condense the water vapor and/or gases, thus reducing the cost of the apparatus by not requiring a separate condenser unit 66 and by serving to reclaim the otherwise lost energy in the water vapor. The aggregate may be preheated by this procedure. A suitable arrangement is shown, for example, in U.S. Pat. No. 2,519,148 of McShea, however, the condensing arrangement need not be so complex. Generally, it will be sufficient if the arrangement is as shown schematically in dotted lines in FIGS. 1A and 1B.

Water vapor and other gases may be pumped or, preferably, forced out of mixing chamber 28 by virtue of their own vapor pressure, through conduits 72 and 73. Conduit 73 may lead to or be integrally formed with a condenser coil 75 in hopper 18. Condenser coil 75 may be integrally formed with or attached to a conduit 77 for controlling the flow of the condensate. Condensor coil 75 is shown as being located in hopper 18 only for purposes of illustration. Other condenser coils in other hoppers 12, 14 and/or 16 or even inlet hopper 26 may be attached to conduits 73 and 77 in a series or parallel connection. Any suitable valving may be incorporated into the hopper condenser system as desired.

The condensate, comprising mostly water, is removed from condenser 66 or 75 through conduit 78 or 77, respectively, and flows into storage tank 80. A flow sensor 79 is used to determine the amount of condensate flowing from condenser 66 or 75 to tank 80. Any hydrocarbons or undesirable materials present in the condensate may be removed, if desired, from the condensed water by conventional devices before the water enters storage tank 80. A typical device suitable for use in removing hydrocarbons from the condensed water is the "BilgeMaster" separator available from National Marine Service, Inc. The trace hydrocarbons or other condensed materials may be reclaimed and/or discarded, if desired, in accordance with standard procedures. A test of the condensate from asphalt concrete made in a laboratory apparatus according to the present invention has indicated that the condensate complies with current discharge standards.

Storage tank 80 may be equipped with a standard level control, drain pipe and water inlet, all of which are conventional and are not shown in the drawings. Water from tank 80 may be recycled into mixing chamber 28 by being pumped by pump 82 through conduit 84 and valve 86 into inlet control 38. It is not necessary that conduit 84 lead into inlet control 38. Instead, if desired, valved conduit 84 can connect directly with mixing chamber 28 anywhere along its length, but preferably near its inlet end. The water may be preheated prior to being introduced into chamber 28 by the excess heat from the heater 54 or by heat from the vapor condensing system.

Information in the form of electrical signals is generated by sensor devices, such as moisture sensors, pressure sensors, flow sensors and temperature sensors. Such sensor devices or transducers are conventional and are readily commercially available.

A moisture sensor 88 is used to determine the moisture content of the aggregate in inlet hopper 26. A temperature sensor 92 is used to determine the temperature of the asphalt concrete mixture in mixing chamber 28. Temperature sensor 92 is preferably located in a side portion of mixing chamber 28 so as to accurately sense the temperature of the asphalt concrete mixture.

A pressure sensor 94 is used to determine the pressure within mixing chamber 28. Pressure sensor 94 should be located in the top of mixing chamber 29 above the level of the mixture therewithin.

The operation of the apparatus according to the present invention will now be described.

The proper amounts of aggregate according to a particular job mix formula are discharged from silos 12, 14, 16 and 18 by means of feeders 22 onto conveyor 24. The aggregrate is then deposited into inlet hopper 26. There, the moisture of the aggregate is determined by means of moisture sensor 88.

Inlet control 38 meters a specified amount of aggregate into chamber 28. Binder material from tank 42, with or without additives from tank 50, is also introduced into mixing chamber 28. Preferably, the aggregate and binder material are introduced into mixing chamber 28 when the heat exchanger-mixer is in operation. The rate of addition of materials is controlled so as to be coordinated with the mixing rate of the asphalt concrete mixer and the outlet control device. By the time the asphalt concrete mixture reaches outlet control 40, the starting materials should be completely mixed and the product formed in accordance with the job mix formula.

In mixing chamber 28, two generalized conditions concerning temperature and pressure can exist. The temperature will be greater than, equal to, or less than 100° C. (212° F.) and the pressure will be greater than, equal to, or less than atmospheric pressure (0 p.s.i.g.). These conditions are sensed by temperature sensor 92 and pressure sensor 94. Since the amount of material within mixing chamber 28 can be a readily controlled constant amount, the volume within mixing chamber 28 is substantially constant. Accordingly, pressure and temperature are the variables, rather than only temperature as in all the prior art.

When the temperature in mixing chamber 28 is below 100° C., the pressure within mixing chamber 28 generally will be about 0 p.s.i.g. Assuming that the job mix formula calls for a moisture content in the final asphalt concrete product of, say, 2%, and the moisture content of the aggregate in inlet hopper 26 is, say, 3.5%, (and assuming that no other sources of water are added), it will be necessary to remove 1.5% water to achieve the specified moisture content in the final product.

As used herein, the terms "percent" and "%" mean percent by weight based on the total weight of the material under discussion. Thus, when the aggregate is said to have a moisture content of 3.5%, it is meant that the moisture in the aggregate is 3.5% by weight of the total weight of the moisture plus the aggregate.

Should it be necessary to remove 1.5% of the moisture from the mixture to form the product at atmospheric pressure and below 100° C., valve 76 is opened and pump 74 is actuated to cause the vapor to be removed from chamber 28 through conduit 72 into condenser 66 or through conduit 73 to condenser coil 75. After condensation, any uncondensed gases may be returned to mixing chamber 28 through conduit 68 and valve 70. If desired, valve 70 can remain closed and no uncondensed gases will be recycled. This would create a vacuum operation that would reduce the vaporizing temperature of the moisture.

Should the temperature in chamber 28 be greater than 100° C., a positive vapor pressure will exist in chamber 28. The magnitude of the positive pressure is determined by pressure sensor 94. When the temperature, and hence, the pressure, in chamber 28 is sufficient to overcome the pressure existing in conduit 68 or 73 and the tortuous path of the conduits within [condensor] *condenser* 66 or [condensor] *condenser* coil 75, a signal will be sent to close valve 70 and open valve 76. With valve 76 open, the hot, pressurized water vapor migrates to the cold source represented by condenser 66 or condenser coil 75 so as to reach an equilibrium temperature and to reduce the pressure. Thus, the water vapor and other gases will enter into conduit 72 or conduit 73 and flow through condenser 66 or condenser coil 75 because of the vapor pressure within chamber 28. The water condensed from the vapor is collected in storage tank 80.

Assuming that a proportional amount of water is to be added to the asphalt concrete to meet the job mix formula, the water can be added to mixing chamber 28 by being pumped from storage tank 80 by pump 82 through conduit 84, valve 86 and inlet control 38. When the moisture sensor 88 detects that the aggregate has a moisture content below the desired design moisture level, such as less than 2% from the prior example, a proportional control system using pump 82 will make up the difference by adding the correct amount of water.

When the correct amount of water is present in the mixture, as by adding the correct amount from tank 80, all valves will be closed and the product will simply be discharged through outlet control 40. The process and apparatus will be most efficient if the mixture contains the correct amount of water. Should storage tank 80 not contain sufficient water from previous production runs to satisfy the need in a particular run, additional water can be added to tank 80 from a water source through appropriate valving. It is not believed to be necessary to illustrate the water source and valving in the drawings.

A control system integrates the information from moisture sensor 88, temperature sensor 92, flow sensor 79 and pressure sensor 94. Based on the signals from these sensors, the control system opens and closes valves 70, 76 and 86 at the proper time, controls inlet control 38 and outlet control 40, controls the speed of the mixing blades and controls the operation of pumps 74 and 82. In this manner, and as primarily determined by the moisture content of the starting materials, the moisture content of the asphalt concrete mixture and final product can be controlled at some point between about 0.1 and about 10%, and preferably at some point between about 1 and about 4%.

The detailed operation of the control system is illustrated in the self-explanatory flow chart shown in FIGS. 8–20. The flow chart refers to the number of the various components of the apparatus illustrated in FIGS. 1A, 1B, 2A and 2B.

The process according to the present invention will now be described with reference to the following specific, non-limiting examples, based upon laboratory data and data from various equipment manufacturers.

EXAMPLE 1

This example is directed to an asphalt concrete composition made from raw virgin aggregate. The following ingredients were used in the indicated proportions to make a 47.7 kg sample mixture.

| Ingredient | Weight Percent |
|---|---|
| 1 inch stone aggregate having a 2.0% moisture content | 46.3 |
| Sand aggregate having an 8.0% moisture content | 45.4 |
| Filler (lime, fines) having a 0% moisture content | 2.6 |
| Asphalt cement (AC-20) | 5.67 |
| Surfactant (TRITON X-207) | 0.03 |
| Total | 100.00 |

The aggregate and filler are weighed and placed in a sealed vessel so that a 5% composite moisture content as determined by ASTM C136 testing procedure would be retained. The asphalt cement is mixed with the surfactant and the liquid mixture is preheated to 140° C. The aggregate and filler are introduced into the heat exchanger-mixer with its blades turning and then the heated asphalt cement and surfactant are added into the mixing chamber.

The heat exchanger mixer is then sealed, except that an outlet is connected to a tee fitting. A pressure gauge is connected to one end of the tee fitting and an "EPA Method 5" particulate testing filter, followed by a condenser, is connected to the other end of the tee fitting.

The asphalt concrete mixer is heated using steam at 150 p.s.i.g. at a temperature of 185° C. The temperature of the sample mixture rises from room temperature to 100° C. within 2 minutes. If hot oil at a temperature of about 343° C. were used, the time for raising the mixture from ambient temperature to 100° C. would be reduced by about two-thirds or to about 40 seconds.

Figure 3:
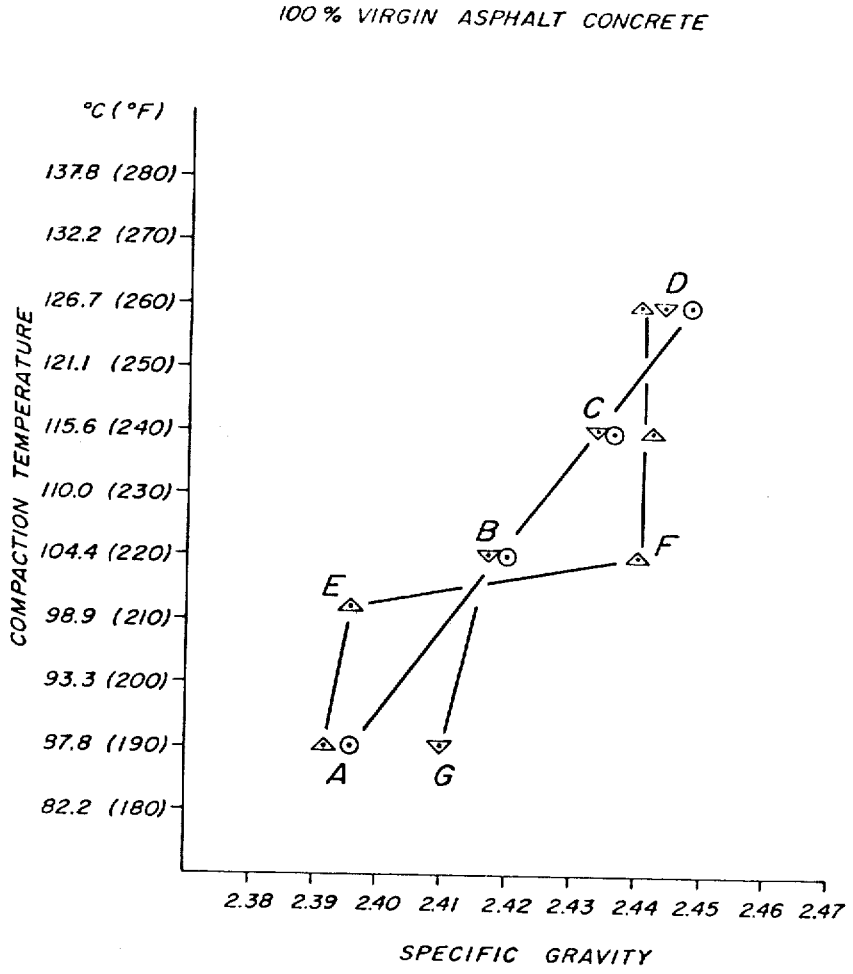
FIG. 3 is a graph illustrating the specific gravity of asphalt concrete made from 100% virgin materials and compares the density of a product made in accordance with prior art processes to the density of a product made in accordance with the process of the present invention.
Figure 4:
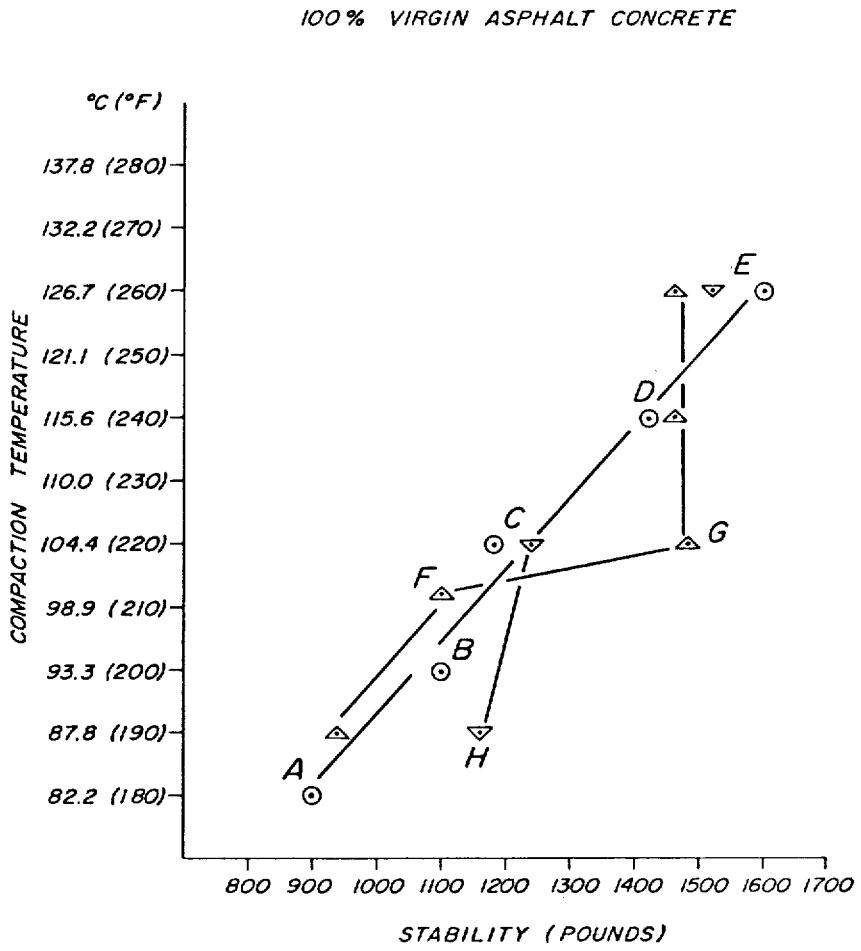
FIG. 4 is a graph illustrating the stability of asphalt concrete made from 100% virgin materials and compares the stability of asphalt concrete made in accordance with prior art processes with a product made in accordance with the process of the present invention.

The mixture remains at around 100° C. for 5 minutes during which free water is evaporated. Several batches are made and water is evaporated from the mixture at various vapor pressures and temperatures. Over a period of 5 more minutes, the temperature rises to 150° C. and the vapor pressure becomes virtually 0 after substantially all of the water evaporates. A vapor pressure of about 1 p.s.i.g. is required to cause the free hot water vapor in the mixing chamber to migrate to the cooler condenser as a function of condenser design. At preselected temperature levels as shown in FIGS. 3 and 4, the asphalt concrete product is removed from the mixing chamber and formed into 1.25 kg samples for testing as described hereinafter.

EXAMPLE 2

This example is for a product containing recycled asphalt concrete.

| Ingredient | Weight Percent |
|---|---|
| Recycled asphalt concrete (cold plane method) having a 0% moisture content | 68.9 |
| 1 inch stone aggregate having | 29.6 |
| Asphalt cement (AC-20) | 1.45 |
| Surfactant (TRITON X-207) | 0.05 |
| Total | 100.00 |

The recycled asphalt concrete was obtained from a deteriorated New Jersey Department of Transportation highway wearing course. The recycled asphalt concrete was crushed and found to have the following size particles as determined by the method of ASTM C136: 98.8% passed through a sieve having openings of ½ inch, 95.9% passed through a sieve having openings of ⅜ inch, 64.8% passed through a No. 4 U.S. sieve, 45.3% passed through a No. 8 U.S. sieve, 21.7% passed through a No.

50 U.S. Sieve and 7.4% passed through a No. 200 U.S. sieve.

The amount of asphalt cement contained in the recycled asphalt concrete was determined in accordance with the method of ASTM D2172 in conjunction with the specific gravity test method of ASTM D2726 and the compaction specification, stability and flow test procedure of ASTM D1559. Using these test methods, blending the recycled material with the stone aggregate, the new asphalt cement and the surfactant, the recoverable asphalt cement content in the recycled road material was determined to be 6% of the recycled material. Thus, the total asphalt cement in the mixture is 5.58%.

The process for making asphalt concrete from a mixture of recycled asphalt concrete, new aggregate and asphalt cement is basically the same as the process set forth in Example 1. Thus, first the new asphalt cement and surfactant are mixed together and preheated to 140° C. Then, the recycled asphalt concrete and the aggregate are added to the heat exchanger-mixer along with the new asphalt cement-surfactant mixture. The heat exchanger-mixer is then sealed in the same manner as Example 1 and the free water removed under its own vapor pressure. The temperatures and times set forth in Example 1 with respect to asphalt concrete made from virgin starting materials also apply to the present example. During heating of the asphalt concrete product, 1.25 kg samples were removed for testing as set forth hereinafter.

Specific gravity and stability tests were conducted on the samples made in Examples 1 and 2. In addition, the same tests were performed on asphalt concrete samples made according to prior art processes. The results are graphed in FIGS. 3–6.

Samples were prepared and tested to determine their specific gravity and stability in accordance with the standard procedures used in the asphalt concrete paving industry. A brief description of the process of preparing the samples with reference to the pertinent ASTM testing methods follows.

Samples of the various test specimens were prepared promptly after discharge of the product from the mixing apparatus. "Marshall Specimens" were prepared in accordance with ASTM D1559. A thermometer was used to check the temperature of the discharged asphalt concrete product. The temperature of the specimen prepared from the sample of the asphalt concrete product was taken just prior to compaction. The time period from discharge of the product sample from the mixing chamber until compaction of the samples at each level was 3 to 10 minutes. No meaningful drop in temperature from discharge to compaction was noted.

Figure 5:
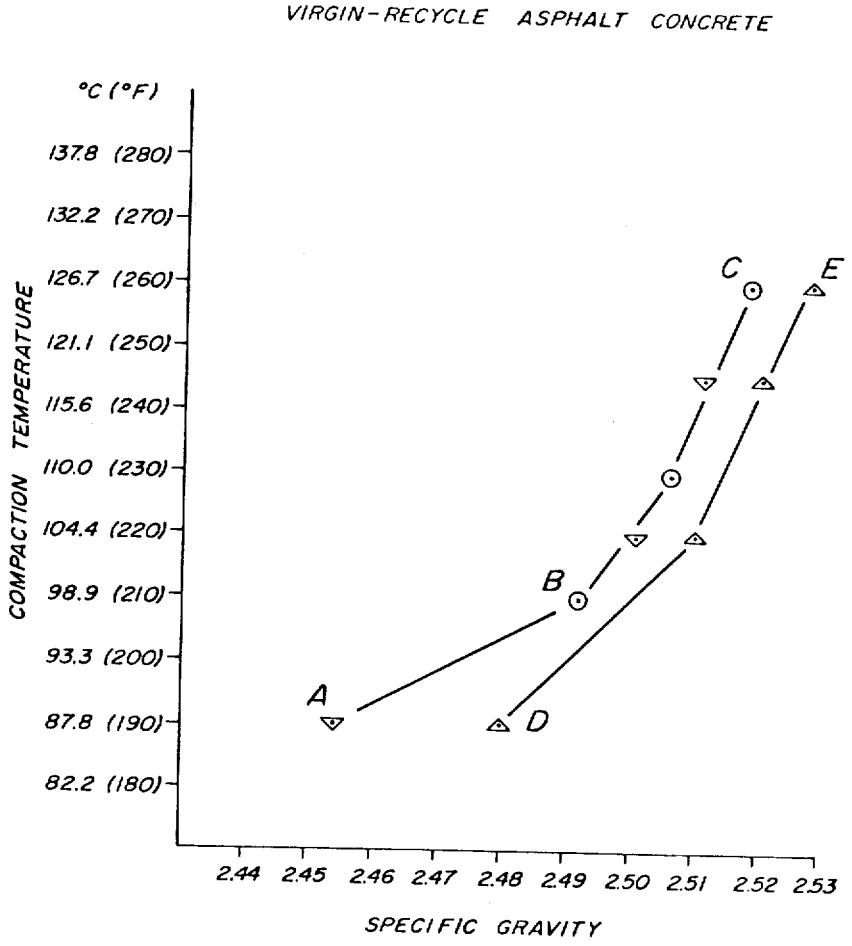
FIG. 5 is a graph illustrating the specific gravity of an asphalt concrete made from about 30% virgin materials and about 70% recycled materials, comparing the density of a product made according to prior art processes to the density of a product made in accordance with the present invention.

The specific gravity of the specimens was determined in accordance with the procedure of ASTM D2726 and plotted to form the graphs of FIGS. 3 and 5. Stability of the specimens was measured in accordance with the procedure of ASTM D1559 at various compaction temperatures and plotted to form the graphs of FIGS. 4 and 6.

In each of the graphs, the synmbol △ represents data with respect to samples of a product prepared in accordance with the present invention. The symbol △ represents data with respect to samples made in accordance with the present invention, but after the moisture content purposefully retained in the product of the present invention had been baked off by placing the product in an oven at atmospheric pressure and baking at 140° C. for 1 hour. The specimens for the data represented by △ were molded at decreasing temperatures, rather than increasing temperatures as was the case for the data represented by △.

The symbol ⊙ represents data with respect to specimens prepared from asphalt concrete made in accordance with the prior art. The same starting materials in substantially the same proportions were used as in Examples 1 and 2, with the exception that no surfactant was used for the samples made in accordance with the prior art method. The prior art method was to heat the aggregate to about 138°-160° C. (280°-320° F.). The heated aggregate was placed in an unsealed mixer and the asphalt cement, preheated to 140° C., was added to the heated aggregate in the mixer. The mixture was mixed until the asphalt concrete product was uniform and 1.25 kg specimens were molded as with the products of Examples 1 and 2.

With reference to FIG. 3, the line A-E-F-D illustrates how the specific gravity varies with the compaction temperature for specimens prepared from the product made in Example 1 according to the present invention. The line A-B-C-D illustrates how the specific gravity varies with the compaction temperature for specimens prepared from asphalt concrete made in accordance with the prior art method. Although the specific gravity of the product made according to the present invention below 100° C. (point E) is less than the specific gravity of the product made in accordance with the prior art process, the specific gravity of the product according to the present invention is significantly greater at 104.4° C. (220° F.) than the specific gravity of the prior art product. See point F compared to point B in FIG. 3.

At point E, corresponding to a temperature of 100° C., no moisture has evaporated from the asphalt concrete mixture. Thus, in this instance, when a specimen was made of this asphalt concrete mixture at 100° C., it contained too much moisture (5%) to provide a suitably dense product.

At point F, the product made in accordance with the present invention contains the optimum moisture content for the particular job mix formula, namely 2.0% at 104.4° C. (220° F.). By the time the asphalt concrete mixture reched 104.4° C., the moisture content had been reduced to 2% by controlled evaporation as determined by measuring the amount of water condensed.

At temperatures greater than about 104.4° C., no significant increase in specific gravity of this asphalt concrete mixture can be achieved. In order for the product made in accordance with the prior art method to achieve the same specific gravity, it is necessary to heat it and compact it at 121.1° C. (250° F.). Thus, a clear advantage of the present invention is that an asphalt concrete product having a higher specific gravity can be produced at significantly lower temperatures when compared to prior art processes. This obviously results in a significant energy and cost savings.

With further reference to FIG. 3, line D-C-B-G illustrates how the specific gravity varies with the compaction temperature for specimens prepared from asphalt concrete made in accordance with the present invention, but after all of the water contained in the product has been evaporated. The purpose of this procedure is to demonstrate that the moisture, rather than the surfactant of the asphalt concrete product prepared in accordance with the present invention is responsible for its increased specific gravity compared to the product made in accordance with the prior art method. The data supports this conclusion. Thus, the specific gravity of the product made in accordance with the present invention but containing no moisture (since the moisture was baked out of the product) varies with the compaction temperature curve in a manner very similar to that for the product prepared according to the prior art method. Since the only difference between the product whose data is plotted in line A-E-F-D and the product whose data is plotted in line D-C-B-G is moisture content, the presence of the surfactant is not believed to have a significant effect on the specific gravity of the product. The purpose of the surfactant is to enhance the mixing of the liquid and solid ingredients.

FIG. 4 is a graph illustrating how the stability varies with the compaction temperature of the same products referred to with respect to FIG. 3. Line A-F-G-E represents the data for the product made in accordance with Example 1. Line E-C-H represents data for the same product after the moisture had been substantially completely evaporated. Line A-B-C-D-E represents data for a product made in accordance with the prior art method wherein no effort was made to control the moisture content of the product.

The stability of the sample is a measure of its strength, and, indirectly, its durability. As expected, the stability data corresponds to the specific gravity data. Thus, asphalt concrete having a higher specific gravity generally has fewer air voids, generally has a larger number of pores filled with asphalt cement and therefore, it has greater stability and strength than the same product with a lower specific gravity. The test for these characteristics was made in accordance with the procedures of ASTM C127, ASTM C128, ASTM D2726 and ASTM D1559.

FIG. 4 illustrates that a product with significantly greater stability may be attained in accordance with the present invention when compared to products prepared in accordance with the prior art. Thus, at 104.4° C. (220° F.), the points in the vicinity of the letter C with respect to the product made from the prior art method and the product made in accordance with the present invention but having the moisture evaporated show a stability of about 1200 pounds. The product made in accordance with the present invention, has a stability of about 1475 pounds at the same compaction temperature (point G). The product made in accordance with the prior art does not achieve this degree of stability until about 119° C. (246° F.). Again, the data support the conclusion that a superior product can be made at a lower temperature according to the present invention.

FIG. 5 illustrates how specific gravity varies with the compaction temperature of a product made in accordance with Example 2, of the product made in accordance with Example 2 but having had the moisture evaporated therefrom, and of a product made from the same type and proportion of recycled and virgin components as Example 2, but made in accordance with the prior art methods.

Line B-C represents data with respect to specimens made according to the prior art process. Line C-A represents data with respect to specimens made in accordance with the present invention, but after all moisture had been evaporated from them. Line D-E represents data with respect to a product made in accordance with Example 2, which uses a substantial portion of recycled asphalt concrete.

As is clear from FIG. 5, the specific gravity of the product made in accordance with the present invention is greater than the specifc gravity at corresponding compaction temperatures of the other two products. Thus, for example, in order to achieve the specific gravity of the product of the present invention at 104.4° C. (220° F.), a product made in accordance with the prior art would have to be compacted at 115.6° C. (240° F.). Again, this clearly indicates that significant energy and cost savings are available by making the product in accordance with the present invention. The line C-A illustrates that the moisture, not the surfactant, in the product of the present invention is responsible for its increased specific gravity.

Figure 6:
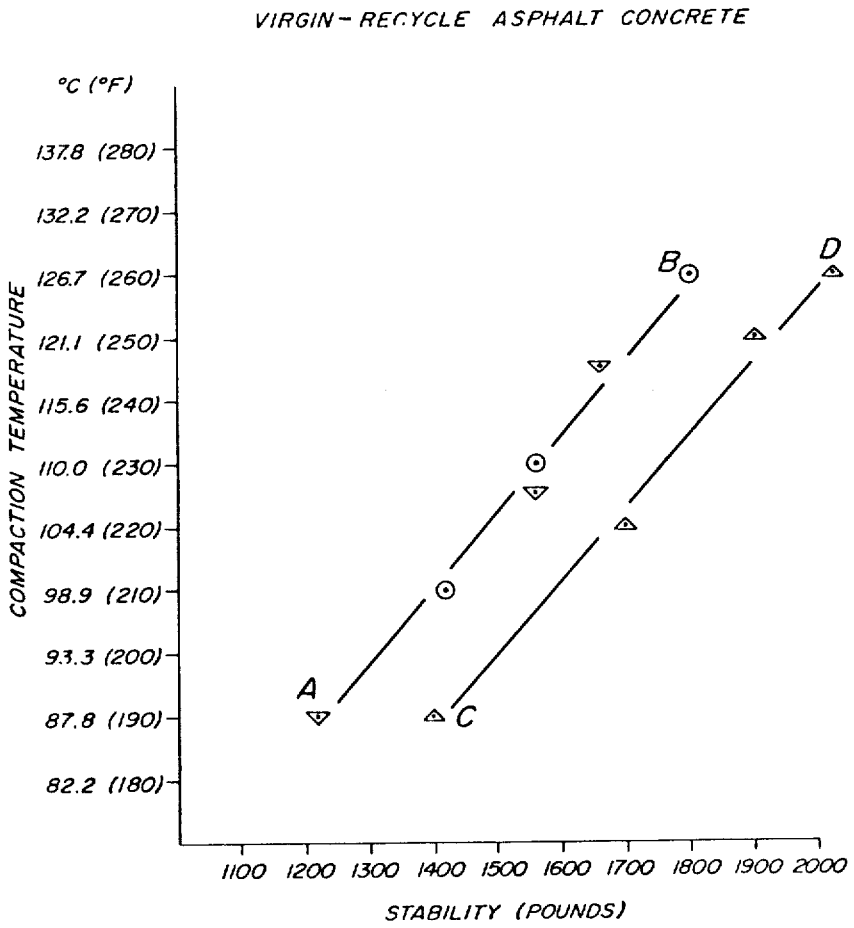
FIG. 6 is a graph illustrating the stability of asphalt concrete made from about 30% virgin materials and about 70% recycled materials, comparing the stability of a product made in accordance with prior art processes with a product made in accordance with the process of the present invention.

FIG. 6 is a graph of the data which illustrates how stability varies with compaction temperature for the same products described with respect to FIG. 5. Once again, the data plotted on the graph in FIG. 6 clearly indicates that at a given temperature, the stability, and therefore, strength, of a product made in accordance with the present invention is greater than the strength of a product made in accordance with the prior art or of a product made in accordance with the present invention but where the water has been evaporated. Thus, at 104.4° C. (220° F.), the product made in accordance with the present invention has a stability of about 1670 pounds whereas the other products have a stability of about 1480 pounds. The prior art product and the product whose water was evaporated do not attain the strength at 104.4° C. of the product made in accordance with the present invention until they are compacted at 117° C. (242.5° F.).

Many batches of the asphalt concrete product were made using the same ingredients in the same proportions in accordance with Example 1. Samples were molded to give the data plotted in FIGS. 3 and 4. With reference to FIGS. 3 and 4, it is clear that an asphalt concrete product having maximum specific gravity and stability was obtained at about 104.4° C. (220° F.). For the product at point F in FIG. 3 (the same product is plotted at point G in FIG. 4), the moisture content was determined to be 2%. This was determined by measuring the amount of water evaporated and condensed from the asphalt concrete mixture and subtracting it from the moisture content of the starting materials.

Since the product had optimum specific gravity and stability with a 2% moisture content, 2% moisture content is considered the optimum moisture content for this particular asphalt concrete mixture. Thus, optimum moisture content is defined as the amount of moisture in asphalt concrete which will impart the maximum specific gravity and stability to the asphalt concrete at the lowest temperature at which the asphalt concrete will have the maximum specific gravity and stability.

At this lowest temperature of maximum specific gravity and stability, and at substantially any temperature greater than 100° C. at which a significant vapor pressure will exist, the amount of water or moisture to be evaporated from the asphalt concrete can be controlled by controlling the vapor pressure within the mixing chamber.

Figure 7:
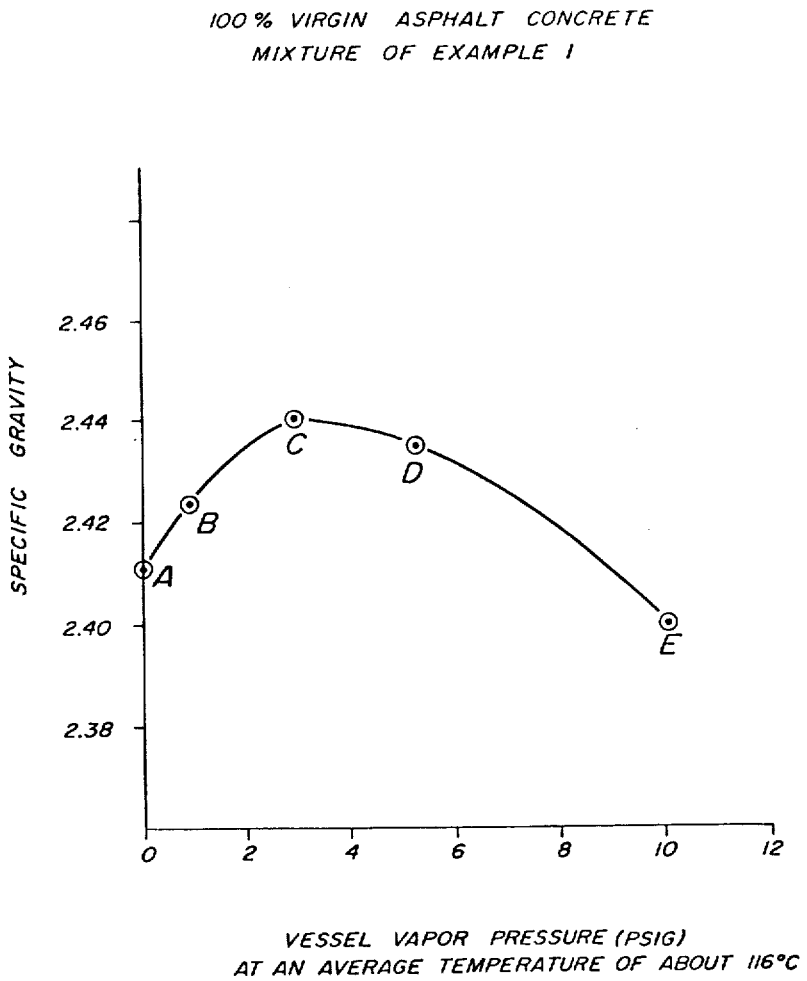
FIG. 7 is a graph illustrating how specific gravity varies with vapor pressure for a product made in accordance with Example 1 where the product is maintained at an average temperature of about 116° C. (240.8° F.) within the mixing chamber of the apparatus of the present invention.
Figure 8:
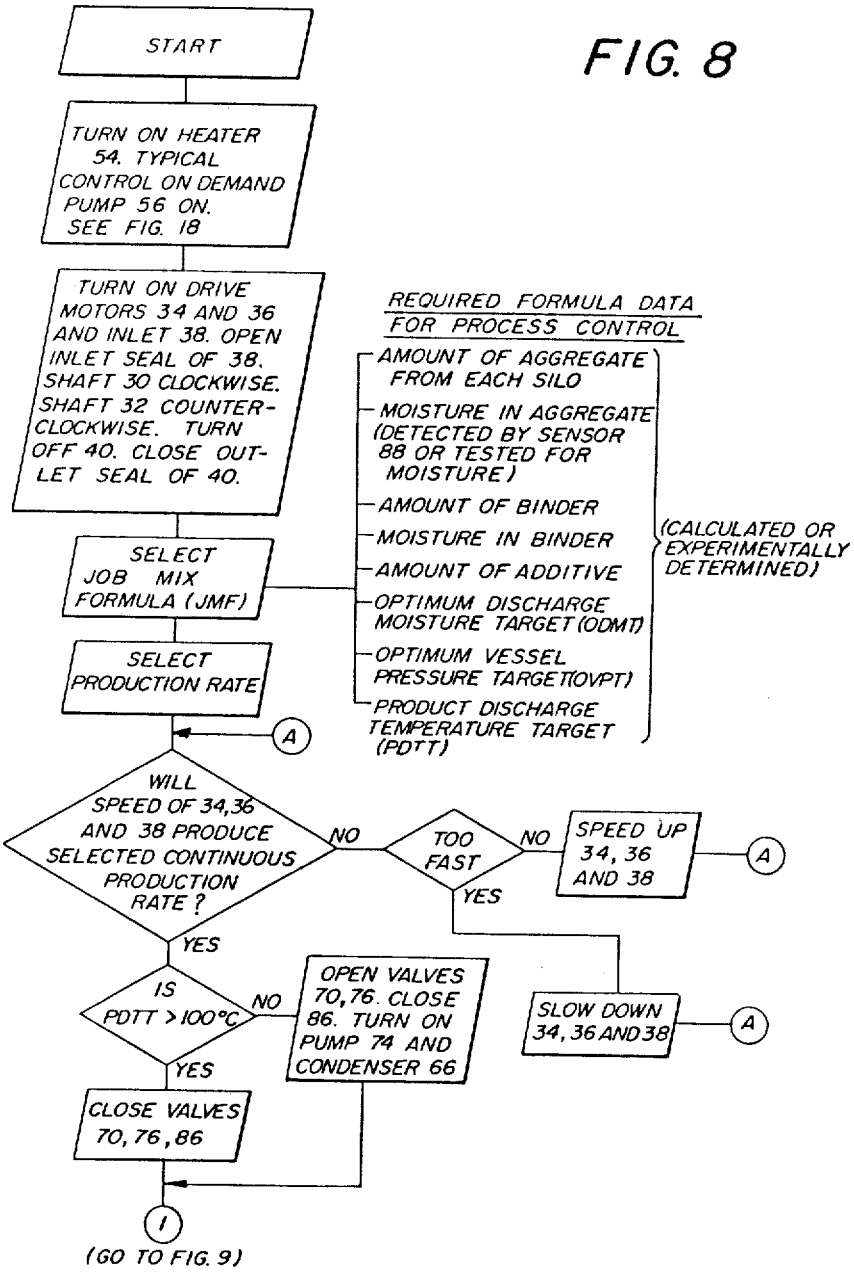
FIGS. 8–20 depict a self-explanatory flow chart setting forth the operation of a preferred embodiment of the present invention.
Figure 9:
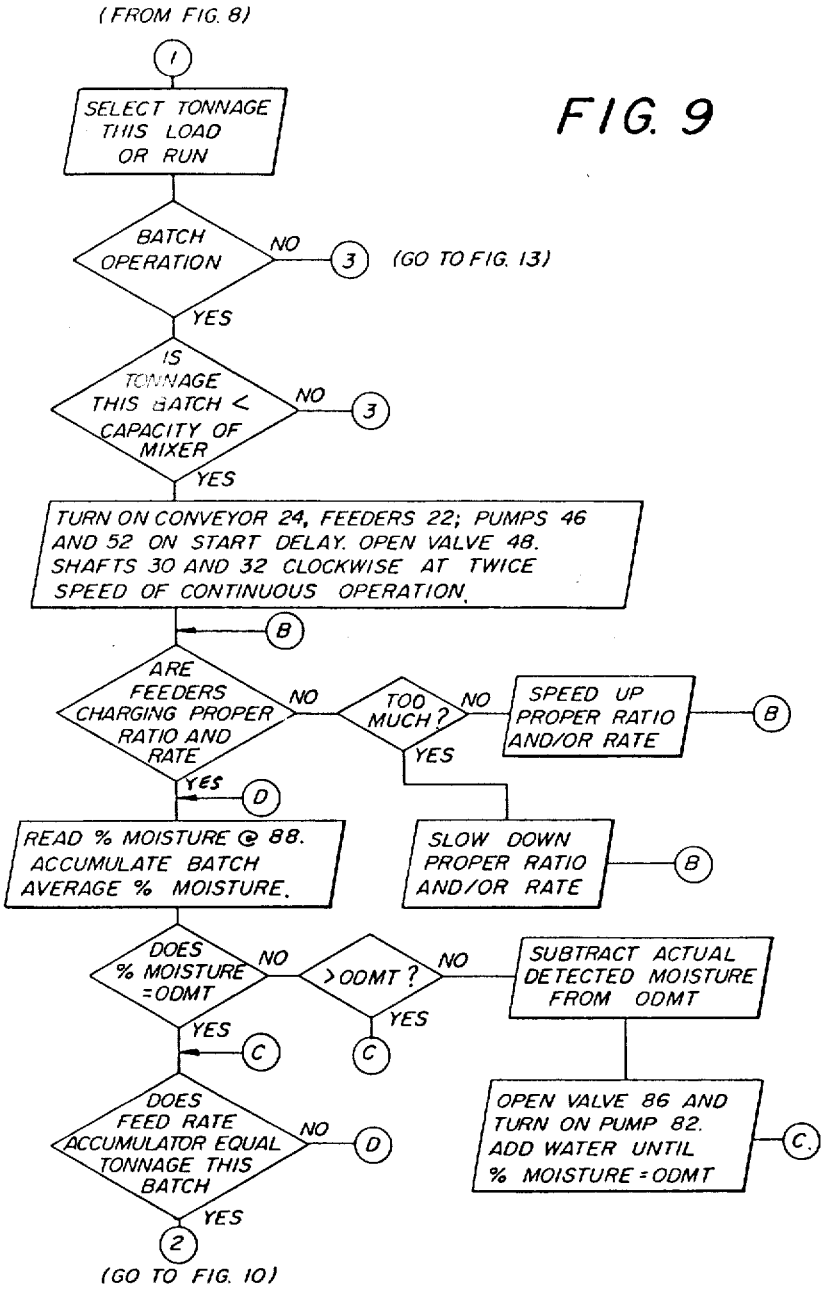
Figure 10:
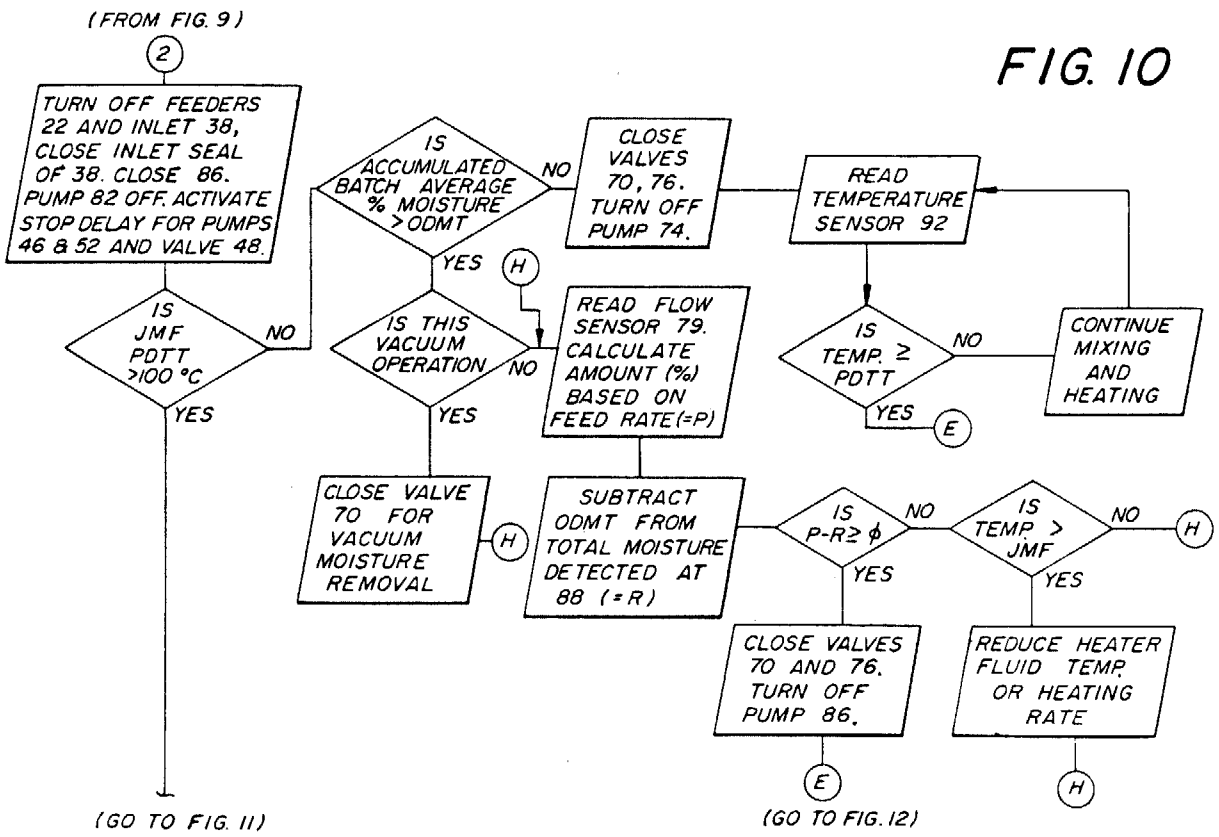
Figure 12:
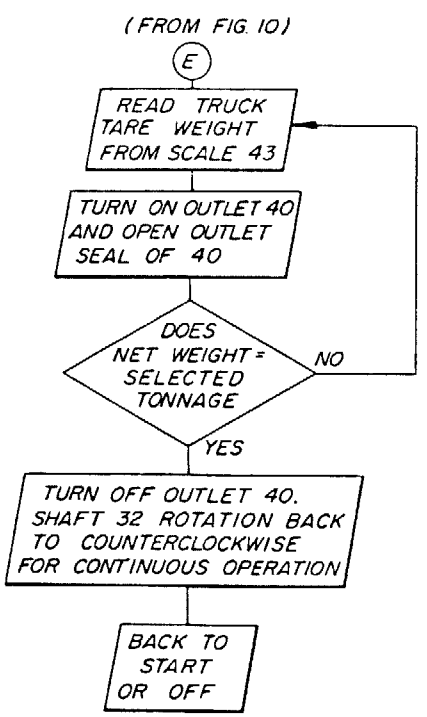
Figure 11:
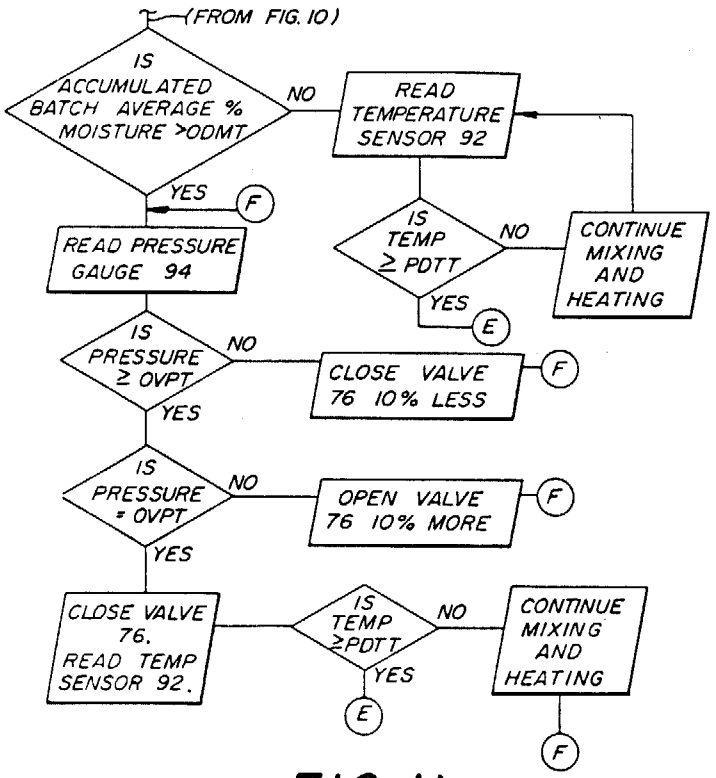
Figure 13:
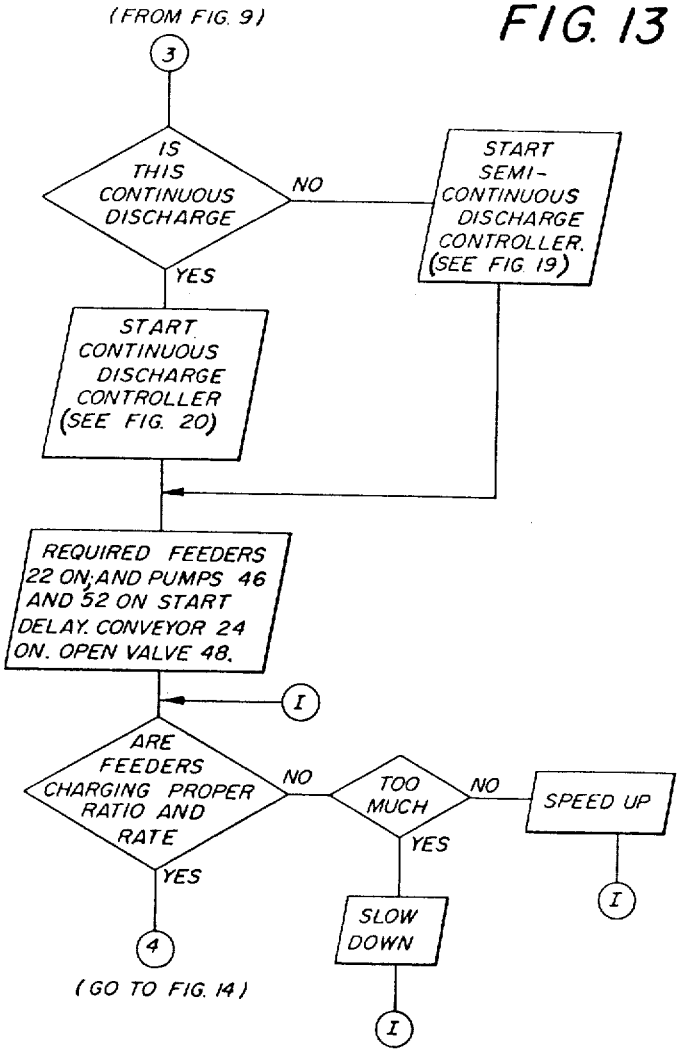
Figure 14:
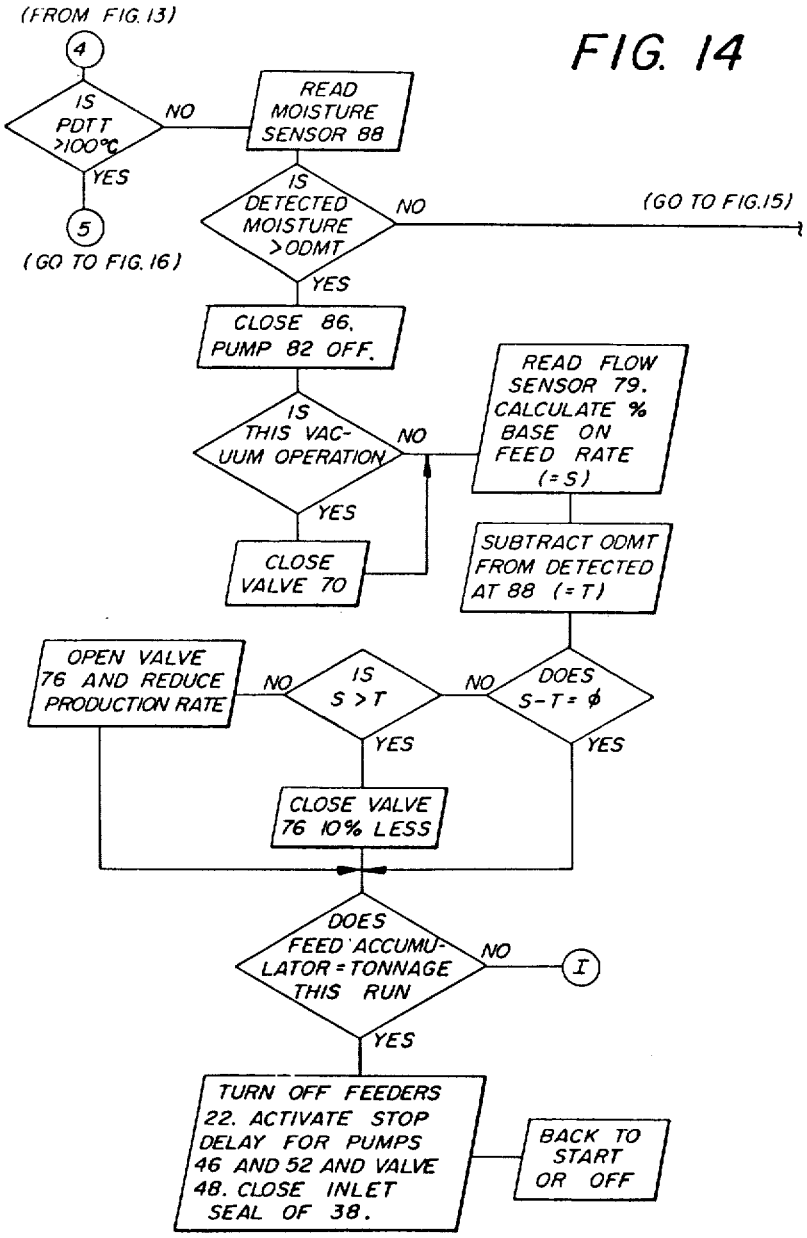
Figure 15:
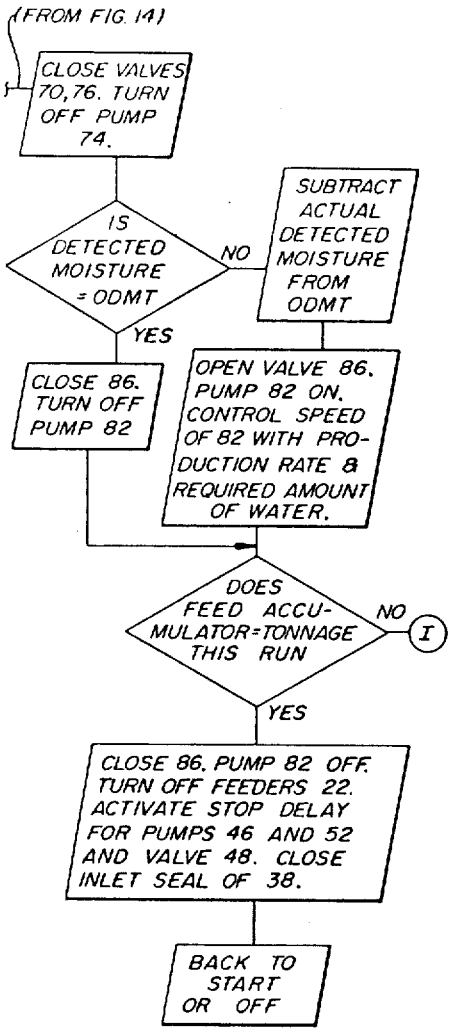
Figure 16:
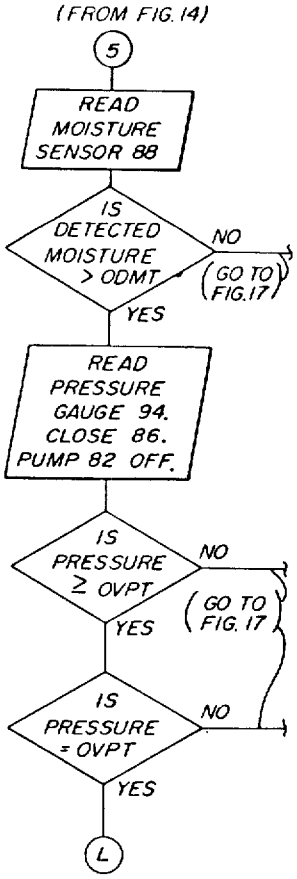
Figure 17:
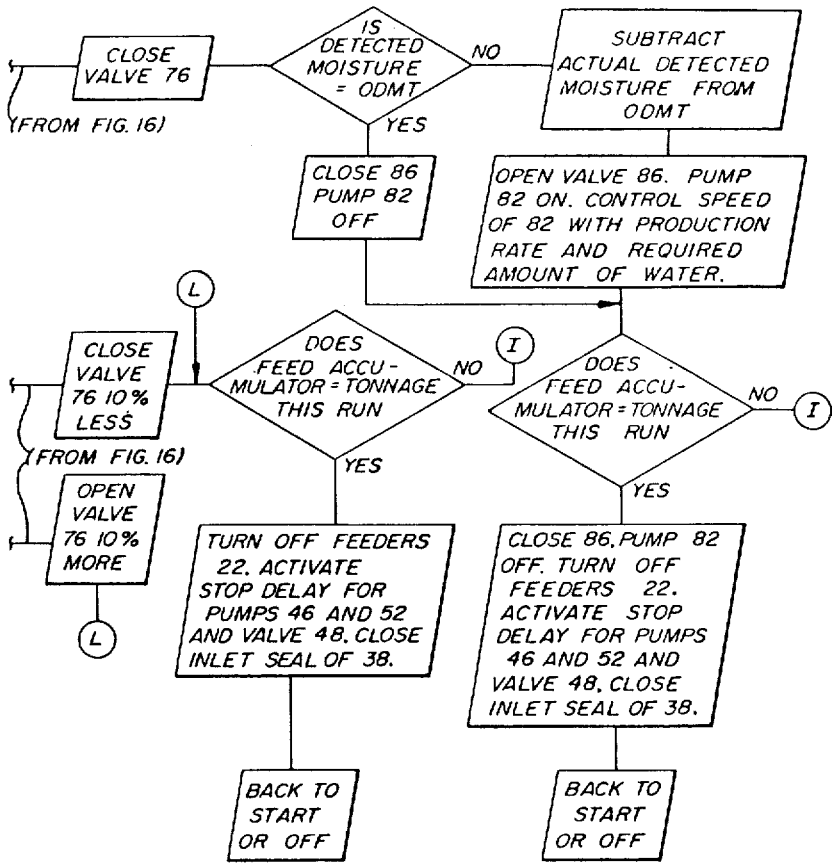
Figure 18:
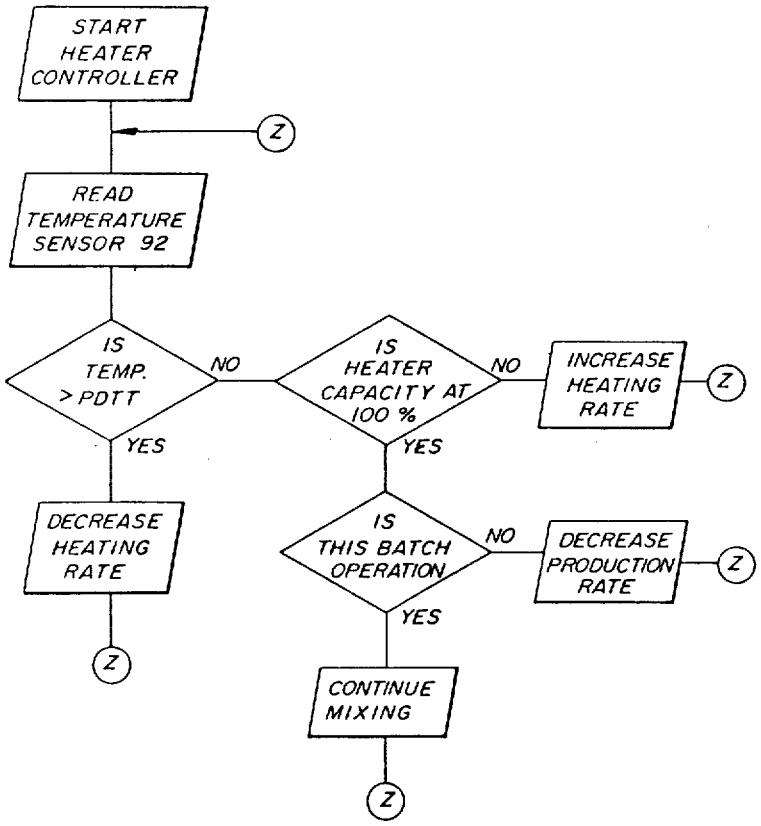
Figures 19, 20:
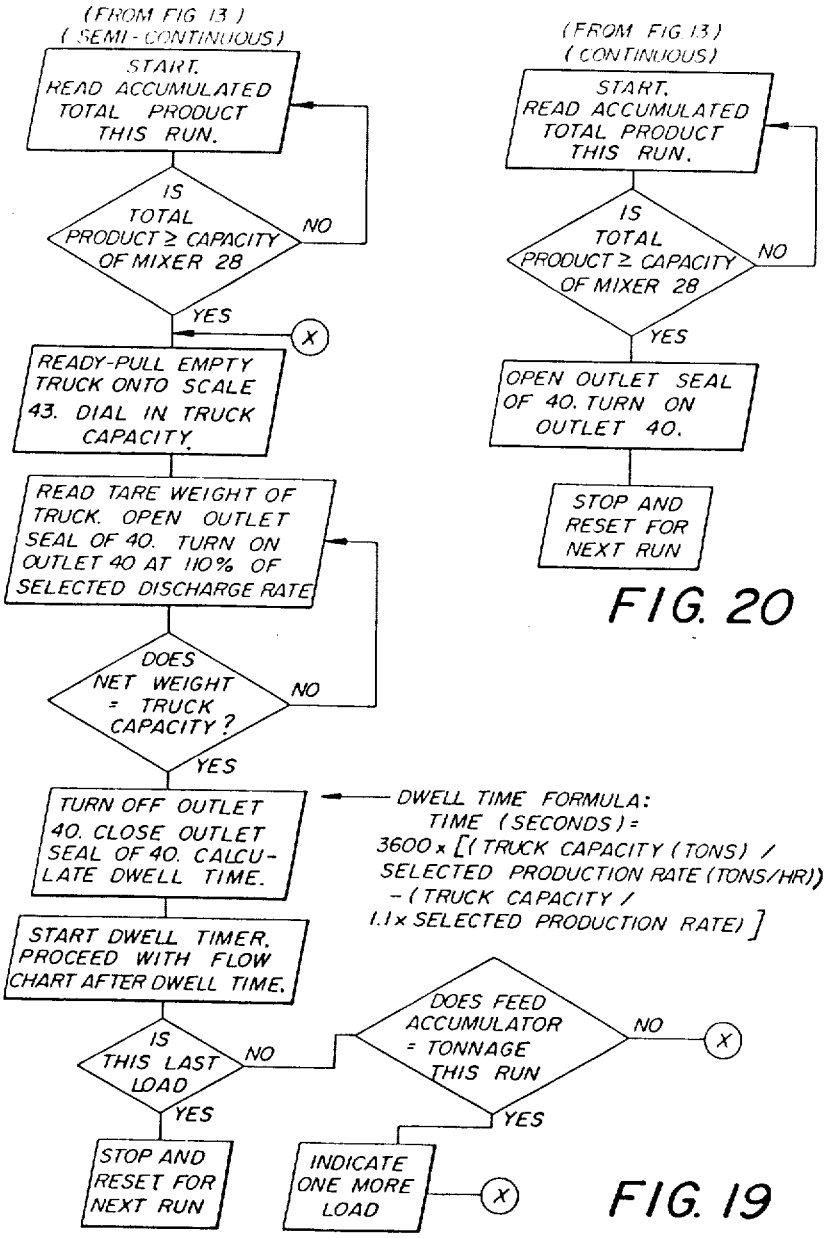

FIG. 7 illustrates the relationship between specific gravity and vapor pressure for a specific asphalt concrete made in accordance with Example 1. To obtain the data plotted in FIG. 7, a batch of asphalt concrete was made as set forth in Example 1, but the temperature was maintained at an average temperature of 116° C. (240.8° F.) This temperature was chosen so that the vapor pressure of the water vapor evaporated from the asphalt concrete in the mixing chamber would be as high as about 10 p.s.i.g., the maximum limit for vapor pressure of water at that temperature.

The pressure in the mixing chamber was varied while the data was being collected for FIG. 7 by opening and closing a valve corresponding to valve 76 as shown in FIG. 1A. Point A of FIG. 7 corresponds to a product having a vapor pressure of 0 p.s.i.g. because the valve was completely open. All moisture was evaporated from the product of point A of FIG. 7. The specific gravity of this product measured in the same manner as specified hereinbefore, corresponds to the specific gravity of the product of point B of FIG. 3 made according to the prior art method.

Point E of FIG. 7 corresponds to a product having a vapor pressure of about 10 p.s.i.g. because the valve was completely closed. All moisture was therefore retained in the product of point E of FIG. 7. The specific gravity of point E of FIG. 7 corresponds to the specific gravity of point E of FIG. 3.

Maximum specific gravity of the substantially identical products whose data was plotted in FIG. 7 is at point C of FIG. 7. This point corresponds to a vapor pressure of about 3 p.s.i.g. The pressure was maintained at 3 p.s.i.g. by partially closing the valve. Specific gravity was determined from a sample of the product removed from the mixing chamber when sufficient water had evaporated to cause a drop in pressure to just below 3 p.s.i.g. 3 p.s.i.g. represents the optimum moisture content of the asphalt concrete product being tested, since maximum specific gravity is obtained at this pressure. Compare point C of FIG. 7 with points C and F of FIG. 3. Because the maximum specific gravity can be achieved at 104.4° C., point F of FIG. 3, there is no need to heat the mixture to a higher temperature. A vapor pressure of about 3 p.s.i.g. can be obtained by heating water to 104.4° C. Thus, a vapor pressure of 3 p.s.i.g. corresponds to the lowest temperature of maximum specific gravity and stability and optimum moisture content for this product.

In summary, the data plotted in the graphs of FIGS. 3–7 clearly indicate that the asphalt concrete made in accordance with the present invention has a higher specific gravity and greater stability at significantly lower temperatures than asphalt concrete made in accordance with the prior art methods or made by a process in which the moisture content of the final product is not properly controlled.

The underlying result of making asphalt concrete in accordance with the present invention is that a product can be produced having the same quality at a lower temperature than possible with prior art processes with a reduction in fuel consumption and corresponding cost savings. While the prior art seems concerned with evaporating all available moisture, the present invention is based on the premise that an optimum moisture content of about 0.1 to about 10% in the final product is beneficial. It is believed that the potential thermal energy of the moisture in the virgin aggregate (1% to 4% typically) represents about 20% to about 50% of the thermal energy within the asphalt concrete mixture. In the prior art processes, this potential energy is wasted and more energy is consumed in evaporating this moisture. In the present invention, energy is conserved and used to achieve an equal quality product at a lower temperature. Through the efficient heat recovery methods set forth hereinbefore, namely the use of heat usually exhausted in heating the heat exchange fluid and the use of heat from the condensed vapor, even less energy is used with the present invention compared to the prior art.

The following example illustrates typical equipment and process parameters for using the apparatus and process of the present invention.

EXAMPLE 3

For purposes of this example, mixing chamber 28 contains two "PROCUPINE" heat exchange mixing screw assemblies from The Bethlehem Corp., with each screw having a diameter of 4 feet and a length of 24 feet. Using data supplied from The Bethlehem Corp., the mixture volume within mixing chamber 28 is about 400 cubic feet. A typical uncompacted density of an asphalt concrete mixture is about 120 pounds per cubic foot. Accordingly, if the mixing chamber were completely full, it could hold 24 tons of asphalt concrete. It will be assumed that mixing chamber 28 will be 90% full during operation, giving a capacity of about 22 tons of asphalt concrete.

Assume a production rate of 250 tons of product per hour or 4.17 tons per minute. This is equivalent to about 70 cubic feet of product per minute. Assuming that the blades advance the product 3 inches per revolution, this means that 4 cubic feet will move for every rotation. At 70 cubic feet per minute required, the shaft should turn at 17.5 rpm.

Assume inlet control 38 and outlet control 40 are identical variable speed screw conveyors, each having an 18 inch diameter. Accordingly, each screw has an area of 1.77 square feet and, assuming the advance rate of material through the screws is 0.5 feet per revolution, each screw will carry 0.885 cubic feet of material per revolution. The inlet screw conveyor must be full enough to provide an airlock to seal the mixing chamber from the atmosphere. To move about 59.5 cubic feet of aggregate per minute (aggregate=about 85% of the asphalt concrete mixture by volume), the inlet screw conveyor must rotate at a rate of 67.2 rpm.

To remove 70 cubic feet of asphalt concrete per minute from the mixing chamber, the outlet control screw conveyor must rotate at a rate that compensates for the additional volume of the binder, such as 79.1 rpm for continuous operation. In semicontinuous operation, the outlet control screw conveyor operates at 110% of the rate of the speed for continuous operation to allow for build-up of product in the mixing chamber during the time it takes to move another vehicle or other container under the outlet. This assumes that the outlet screw conveyor has the same dimensions and advance rate as the inlet screw conveyor and that it runs completely full to provide an airlock. Standard linear control devices can control the speed of the inlet screw conveyor, the rate of addition of asphalt cement and other additives, the heat exchanger-mixer speed and the outlet control screw conveyor speed.

The temperature of the asphalt concrete mixer within mixing chamber 28 will generally be heated at between about 176.6° C. (350° F.) and 454.4° C. (850° F.). Upon entering the mixing chamber, the aggregate will have a temperature of about 21.1° C. (70° F.) and will have a vapor pressure of 0 p.s.i.g. At the outlet end, the products will have a temperature between 93.3° C. (200° F.) and 148.9° C. (300° F.). The maximum saturated vapor pressure in the mixing chamber will be about 26 p.s.i.g. when the apparatus operates in the continuous or semicontinuous mode. The maximum saturated vapor pressure attainable would be 52 p.s.i.g. in the batch mode.

The present invention may be embodied in other specific forms without departing from the spirit or essential attributes thereof and, accordingly, reference should be made to the appended claims rather than to the foregoing specification, as indicating the scope of the invention.

I claim:

1. A process for making asphalt concrete comprising:

(a) selectively sealing a mixture of starting materials comprising aggregate and binder, such that said mixture does not communicate with the atmosphere, (b) mixing and indirectly heating said mixture while so sealed, and (c) controlling the moisture content of said mixture to a predetermined amount by either removing moisture from said mixture in the form of water vapor when said moisture content is greater than said predetermined amount until said moisture content equals said predetermined amount, or adding water into said mixture when said moisture content is less than said predetermined amount until said moisture content equals said predetermined amount.

2. A process in accordance with claim 1 wherein said binder material is selected from the group consisting of asphalt cement, asphalt cement-water emulsions, sulfur, and mixtures thereof.

3. A process in accordance with claim 1 including adding a surfactant to said mixing chamber.

4. A process in accordance with claim 1 including the further step of detecting the moisture content of the starting materials prior to said mixing and indirect heating thereof.

5. A process in accordance with claim 1 wherein said aggregate is selected from the group consisting of raw virgin aggregate, recycled aggregate, and mixtures thereof.

6. A process in accordance with claim 1 wherein said mixture is heated to a final temperature in the range of between about 60° C. and about 150° C.

7. A process in accordance with claim 1 wherein said moisture content of said mixture is adjusted to a moisture content in the range of between about 0.1% and about 10%.

8. A process in accordance with claim 1 including heating said mixture to a temperature in excess of 100° C., and removing moisture from said mixture in the form of water vapor by virtue of the vapor pressure of said water vapor.

9. A process in accordance with claim 1 which further comprises condensing said water vapor when moisture is removed.

10. A process in accordance with claim 9 further comprising the step of recycling gases back to said mixture after condensing said water vapor.

*11. In a process for making asphalt concrete*

*(a) selectively sealing a mixture of starting materials including aggregate in a mixing chamber such that said mixture does not communicate with the atmosphere,*

*(b) indirectly heating said mixture while so sealed,*

*(c) evaporating some moisture from said mixture to form water vapor,*

*(d) condensing said water vapor by indirectly exchanging the heat in said water vapor to at least one of said starting materials which heats said starting material prior to the sealing of said mixture in said mixing chamber.*

*12. A process for making asphalt concrete comprising:*

*(a) selectively sealing a mixture of starting materials comprising aggregate and binder, such that said mixture does not communicate with the atmosphere,*

*(b) mixing and indirectly heating said mixture while so sealed,*

*(c) evaporating some moisture from said mixture to form water vapor,*

*(d) condensing said water vapor by indirectly exchanging the heat in said water vapor to at least one of said starting materials which heats said starting material prior to said mixing step.*

*13. A process in accordance with claim 12 further comprising heating said mixture to a temperature in excess of 100° C.*

*14. A process in accordance with claim 13 further comprising heating said mixture to a temperature at which a positive vapor pressure is created sufficient to cause said water vapor to migrate under its own pressure from a mixing means in which said mixture is mixed to a condensing means in which said water vapor is condensed.*

*15. A process in accordance with claim 12 wherein said moisture is evaporated until said mixture has a moisture content in the range of between about 0.1% and about 10%.*

*16. A process for making asphalt concrete comprising:*

*(a) selectively sealing a mixture of starting materials comprising aggregate and binder, such that said mixture does not communicate with the atmosphere,*

*(b) mixing and indirectly heating said mixture while so sealed,*

*(c) evaporating pollutants and some moisture from said mixture to form gases and water vapor,*

*(d) condensing said gases and said water vapor by indirectly transferring heat contained therein to at least one of said starting materials.*

*17. A process in accordance with claim 16 further comprising removing pollutants from said condensed gases and water vapor.*

*18. A process in accordance with claim 16 further comprising heating said mixture to a temperature in excess of 100° C.*

*19. A process in accordance with claim 18 further comprising heating said mixture to a temperature at which a positive vapor pressure is created sufficient to cause said gases and said water vapor to migrate under their own pressure from a mixing means in which said mixture is mixed to a condensing means in which said gases and said water vapor is condensed.*

*20. A process in accordance with claim 16 wherein said moisture is evaporated until said mixture has a moisture content in the range of between about 0.1% and about 10%.*

* * * * *